(12) United States Patent
Connelly et al.

(10) Patent No.: US 7,516,362 B2
(45) Date of Patent: Apr. 7, 2009

(54) METHOD AND APPARATUS FOR AUTOMATING THE ROOT CAUSE ANALYSIS OF SYSTEM FAILURES

(75) Inventors: Jon Christopher Connelly, Windsor, CO (US); Eric William Loy, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 689 days.

(21) Appl. No.: 10/804,275

(22) Filed: Mar. 19, 2004

(65) Prior Publication Data

US 2005/0210331 A1    Sep. 22, 2005

(51) Int. Cl.
*G06F 11/00* (2006.01)
(52) U.S. Cl. ............... 714/26; 714/25; 714/31; 714/37; 714/39; 709/248
(58) Field of Classification Search .......... 714/25, 714/26, 31, 37, 39; 709/248
See application file for complete search history.

(56) References Cited

U.S. PATENT DOCUMENTS 6,681,344 B1 * 1/2004 Andrew .................. 714/38
6,742,141 B1 * 5/2004 Miller ..................... 714/26
7,143,194 B1 * 11/2006 Curley et al. ............ 709/248

OTHER PUBLICATIONS

Null, Linda: The Essentials of Computer Organization and Architecture. © 2003 Jones and Bartlett.pp. 512, 521-525.*

* cited by examiner

*Primary Examiner*—Robert Beausoliel
*Assistant Examiner*—Joseph D Manoskey

(57) ABSTRACT

A method for analyzing the root cause of system failures on one or more computers. An event is generated when a computer system detects a system failure. The cause of the failure is determined. The event, including the cause is transmitted from the computer system to a central repository. And the system failure is analyzed in the central repository.

21 Claims, 15 Drawing Sheets

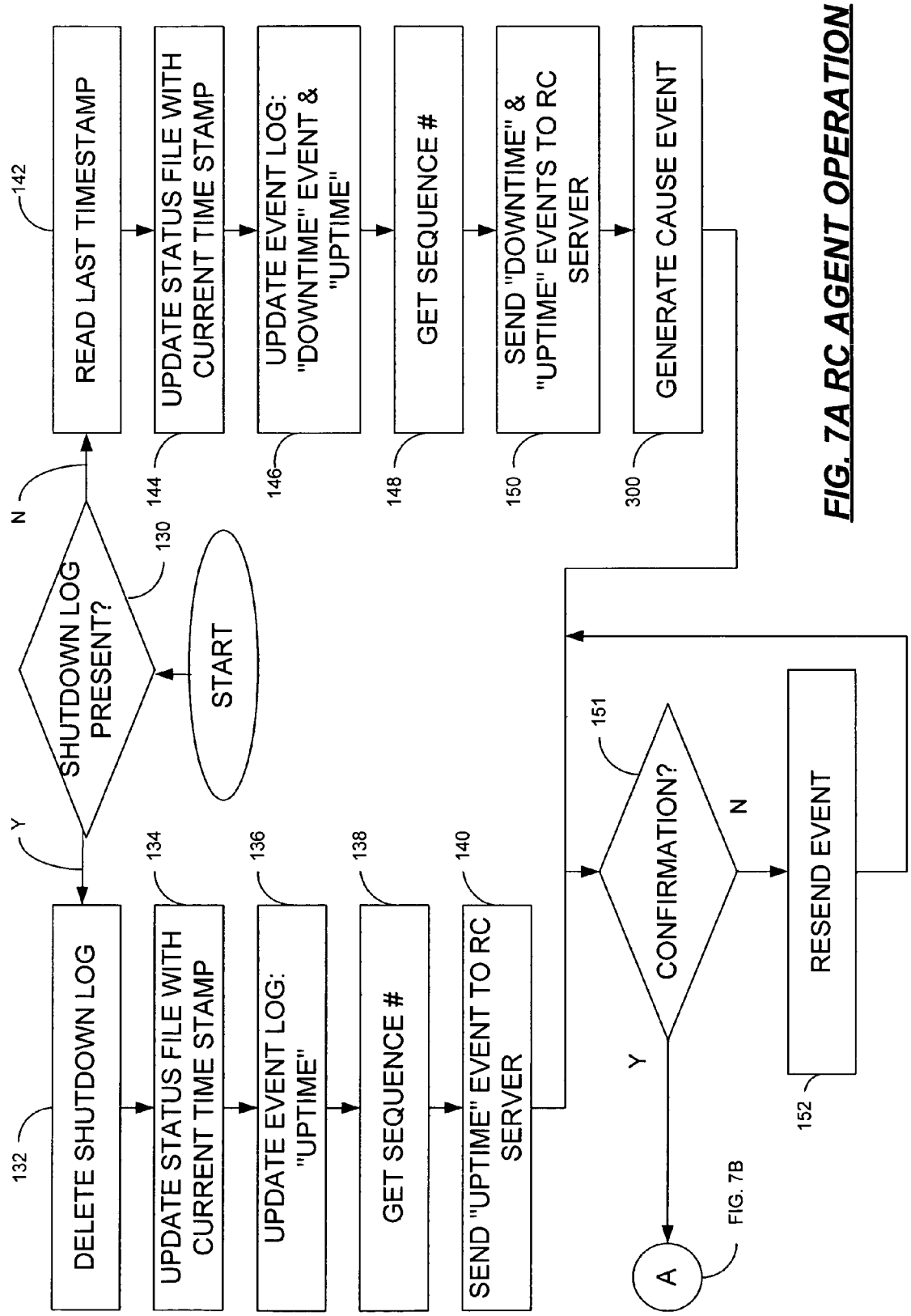
FIG. 7A RC AGENT OPERATION

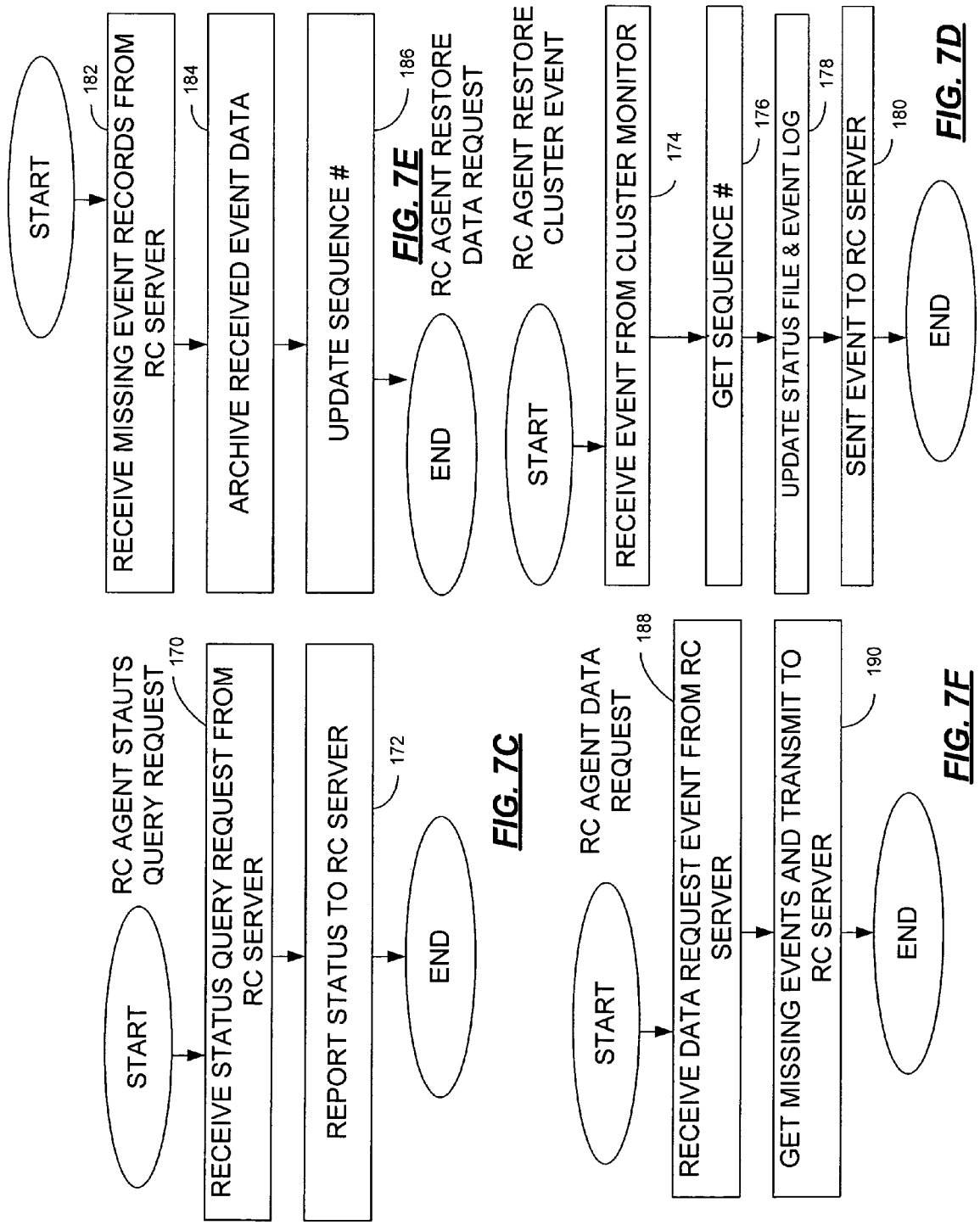

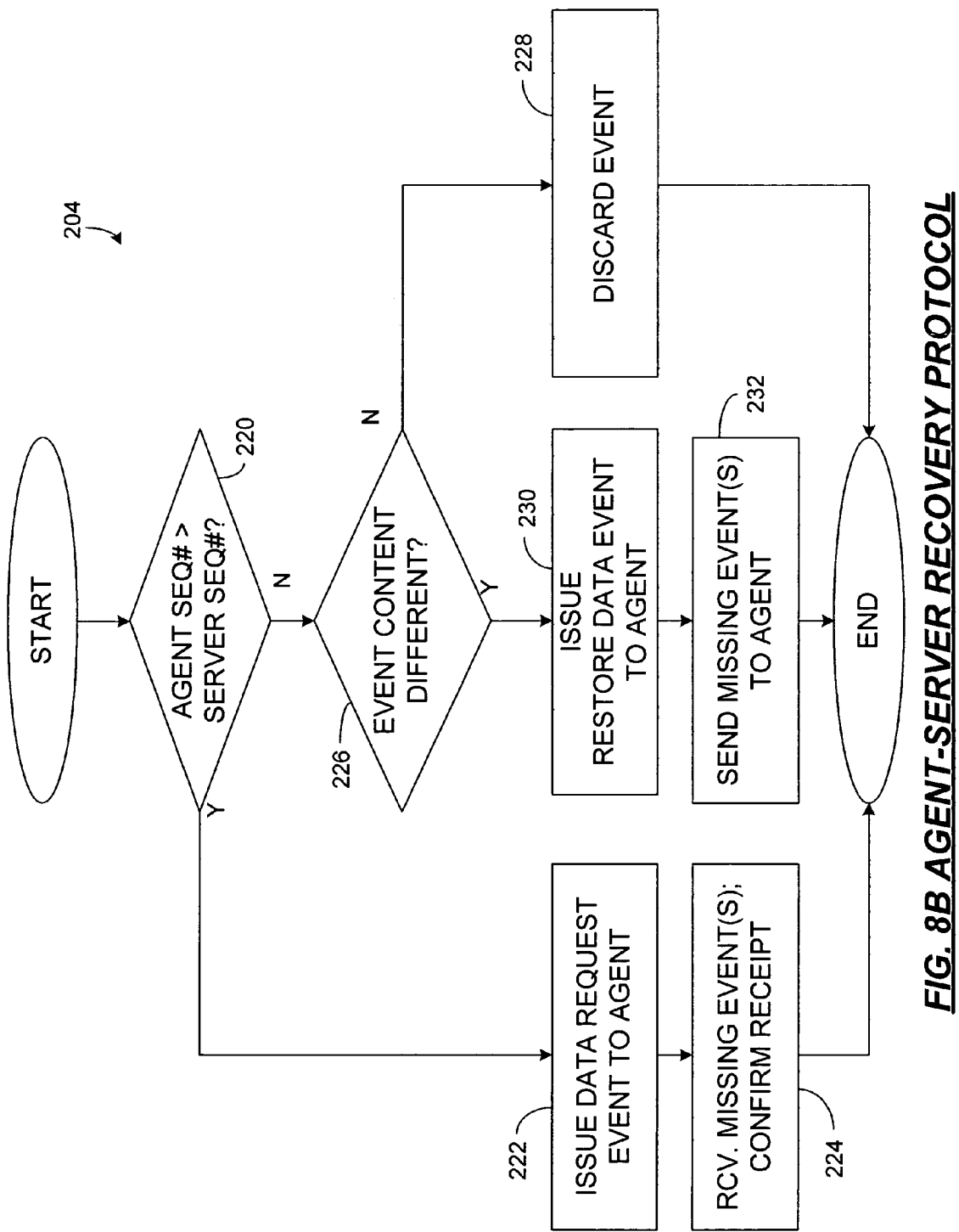
FIG. 8B AGENT-SERVER RECOVERY PROTOCOL

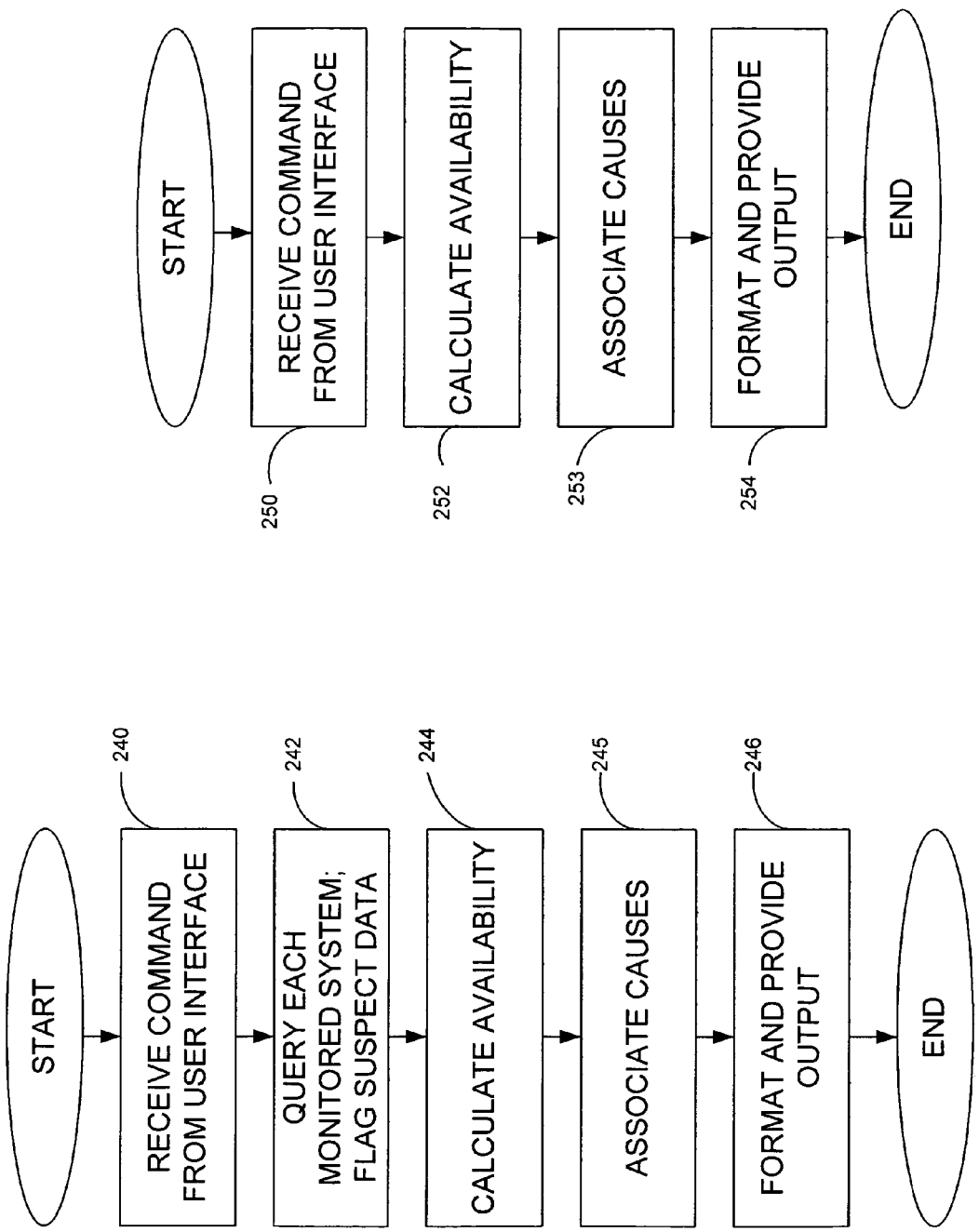
FIG. 8D RC SERVER DATA EXPORT
FIG. 8C RC SERVER DATA RPTG.

RC ANALYSIS AVAILABILITY REPORT
FOR 'CUSTOMER X' FROM HAM installation to Tue Mar 16 11:31:23 MST 2003 PRINTED Tue Mar 16 11:31:28 MST 2003

======================================= System Availability History =======================================

| Event | Date | Entity | Type | Duration | +? P? Notes |
|-------|------|--------|------|----------|-------------|
| 1 | Sun Mar 07 13:11:00 EST 2003 | ms31988ntb | system | | Y began monitoring |
| 2 | Sun Mar 07 13:11:24 EST 2003 | ms31988ntb | system | 219 | Y halted |
| 3 | Sun Mar 07 17:18:57 EST 2003 | ms31988ntb | system | 2 | Y halted |
| 4 | Sun Mar 07 12:22:48 EST 2003 | ms31988ntb | system | 6 | N went down, software |
| 5 | Sun Mar 07 10:59:50 EST 2003 | trinidat.fc.com | system | | Y began monitoring |
| 6 | Sun Mar 07 11:01:29 EST 2003 | trinidat.fc.com | system | 3 | Y halted |

All times in minutes
+ = event ongoing at end of reporting period

======================================= Aggregate System Availability Report =======================================

Number of downtime events: 4
  Number of unplanned downtime events: 1
  Number of planned downtime events: 3
Aggregate monitoring time: 21532
  Total planned downtime: 222
  Total unplanned downtime: 6
System Availability for the period: 0.98915

======================================= Detailed System Availability Report =======================================

| Entity | Accuracy | Entity Information | Availability | ?? |
|--------|----------|---------------------|--------------|-----|
| ms3198ntb | +/- 0.5 min | Vectra XU 6/200 XB6 NT4.0 SP3 | 0.98251 | |
| trinidat.fc.com | +/- 0.5 min | HP-UX B.10.20 A 9000/869 | 0.99975 | |

? = unreachable at time of report, availability may be suspect.

======================================= RC Analysis Error Report =======================================

No errors logged during the reporting period.

*FIG. 8E CAUSE ANALYSIS*

```
Event, I?, Date         ,Time           ,UTC (ms)      ,Entity                ,Type   ,Uptime,Downtime,+?,P?,,Enterprise,Server ID ,Notes
1, Y,Sun 07 Mar 2003,13:11:00 EST,9208374460718,ms3198ntb,system ,   1,   0, , Y,, XXCust,1234567890,began monitoring
2, Y,Sun 07 Mar 2003,13:11:24 EST,9208374484921,ms3198ntb,system ,   0, 219, , Y,, XXCust,1234567890,halted
3, Y,Sun 07 Mar 2003,16:49:47 EST,9208505887125,ms3198ntb,system ,  30,   0, , Y,, XXCust,1234567890,
4, Y,Sun 07 Mar 2003,17:18:57 EST,9208323337296,ms3198ntb,system ,   0,   2, , Y,, XXCust,1234567890,halted
5, Y,Sun 07 Mar 2003,17:20:10 EST,9208374410468,ms3198ntb,system ,1163,   0, , Y,, XXCust,1234567890,
6, Y,Mon 07 Mar 2003,12:42:28 EST,9209221148500,ms3198ntb,system ,   0,   6, , Y,, XXCust,1234567890,went down, hardware
7, Y,Mon 07 Mar 2003,12:47:48 EST,9209224468406,ms3198ntb,system ,4511,   0,+, Y,, XXCust,1234567890,
8, Y,Wed 07 Mar 2003,10:59:50 EST,9210888790203,trinidad     ,system ,   2,   0, , Y,, XXCust,1234567890,began monitoring
8, Y,Wed 07 Mar 2003,11:01:59 EST,9210888889216,trinidad     ,system ,   0,   3, , Y,, XXCust,1234567890,halted
8, Y,Wed 07 Mar 2003,11:03:39 EST,9210889019234,trinidad     ,system ,1736,   0,+, Y,, XXCust,1234567890,
```

Availability Computation

UPTIME = 1 + 30 + 1163 + 4511 + 2 + 1736 = 7443

DOWNTIME = 219 + 2 + 6 + 3 = 230

MONITORED TIME = UPTIME + DOWNTIME = 7673

AVAILABILITY = UPTIME / MONITORED TIME = 0.97002 = 97.002%

*FIG. 8F  AVAILABILITY COMPUTATION*

METHOD AND APPARATUS FOR AUTOMATING THE ROOT CAUSE ANALYSIS OF SYSTEM FAILURES

BACKGROUND OF THE INVENTION

1. Field of the Invention

This invention relates generally to a method and apparatus for automating the root cause analysis of system failures.

2. Description of Related Art

Enterprises increasingly require computing services to be available on a twenty four hours a day, seven days a week basis. Availability is a measure of the proportion of time that a computing entity delivers useful service. The level of availability required by an enterprise depends on the cost of downtime. As availability requirements escalate, the costs to manufacture, deploy, and maintain highly available information technology (IT) resources increases exponentially. Techniques to scientifically manage IT resources can help control these costs, but these require both additional technology and process engineering, including the careful measurement of availability.

The vast majority of servers are supplied with conventional cost-effective availability features, such as backup. Enhanced hardware technologies have been developed to improve availability in excess of 95%, including automatic server restart (ASR), un-interruptable power supplies (UPS), backup systems, hot swap drives, RAID (redundant array of inexpensive disks), duplexing, manageable ECC (error checking and correcting), memory scrubbing, redundant fans and hot swap fans, fault-resilient processor booting, pre-failure alerts for system components, redundant PCI (peripheral component interconnect) I/O (input/output) cards, and online replacement of PCI cards. The next segment of server usage is occupied by high-availability servers with uptimes in excess of 99.9%. These servers are used for a range of needs including internet services and client/server applications such as database management and transaction processing. At the highest end of the availability spectrum are systems that require continuous availability and which cannot tolerate even momentary interruptions, such as air-traffic control and stock-floor trading systems.

Multi-server or clustered server systems are a means of providing high availability, improved performance, and improved manageability. A cluster is a networked grouping of one or more individual computer systems (a.k.a., nodes) that are integrated to share work and to deliver high availability or scalability, and that are able to back each other up if one system fails. Generally, a clustered system ensures that if a server or application should unexpectedly fail, another server (i.e., node) in the cluster can both continue its own work and readily assume the role of the failed server.

Availability, as a measure, is usually discussed in terms of percent uptime for the system or application based on planned and unplanned downtime. Planned downtime results from scheduled activities such as backup, maintenance, and upgrades. Unplanned downtime is the result of an unscheduled outage such as system crash, hardware or software failure, or environmental incident such as loss of power or natural disaster. Measuring the extent, frequency, and nature of downtime is essential to the scientific management of enterprise IT resources.

Previous efforts to measure system availability have been motivated by at least two factors. First, system administrators managing a large number of individual computers can improve system recovery times if they can quickly identify unavailable systems (i.e., the faster a down system is detected, the faster it can be repaired). Second, system administrators and IT (information technology) service providers need metrics on service availability to demonstrate that they are meeting their predetermined goals, and to plan for future resource requirements.

The first factor has been addressed primarily through enterprise management software: complex software frameworks that focus on automated, real-time problem identification and (in some cases) resolution. Numerous vendors have developed enterprise management software solutions. Among the best known are Hewlett-Packard's OpenView IT/Operations, International Business Machines' Tivoli, Computer Associate's Unicenter, and BMC's Patrol. Generally, the emphasis of these systems is the real-time detection and resolution of problems. One side effect of their system monitoring activities is a record of the availability of monitored systems. However, the use of these enterprise management frameworks (EMFs) for availability measurement has certain drawbacks.

First, EMFs generally do not distinguish between "unavailable" and "unreachable" systems. An EMF will treat a system that is unreachable due to a network problem as equivalent to a system that is down. While this is appropriate for speedy problem detection, it is not sufficient to determine availability with any degree of accuracy. Second, because EMFs poll monitored systems over a network, their resolution is insufficient for mission critical environments. The polling intervals are usually chosen to be short enough to give prompt problem detection, but long enough to avoid saturating the local network. Polling intervals in excess of ten minutes are typical. This implies that each downtime event has a 10-minute margin of error. High availability systems often have downtime goals of less than 5 minutes per year. Thus, systems based on polling are inherently deficient and unable to measure availability for high availability systems with a sufficient degree of accuracy. Third, while EMFs can monitor the availability of system and network resources to a certain degree, they do not have a mechanism for monitoring redundant hardware resources such as clusters, or for detecting the downtime associated with application switchover from one system to another. For example, the availability of service for a cluster may be 100% even though one of its nodes has failed. Finally, EMFs tend to be very complex, resource intensive, and difficult to deploy.

The second motivational factor has been approached in a more ad hoc fashion. The emergence of service agreements containing uptime commitments has increased the necessity of gathering metrics on service availability. For example, Hewlett-Packard has a "5 nines: 5 minutes" goal to provide customers with 99.999% end-to-end availability through products and services (equivalent to 5 minutes/year of unplanned server downtime). Previous efforts to obtain these metrics were attempted with scripts and utilities run on individual servers and utilizing manual collection of data from response centers. However, most attempts suffered from an inability to determine the availability of multiple systems, including standalone servers and multiple clusters, and to do this accurately and over multiple reboots.

Hewlett-Packard has developed several utilities for monitoring availability. Uptime 2.0, BANG (business availability, next generation) is based upon a "ping" model of operation. The utility periodically "pings" a monitored client to verify that it is up. If the client does not respond, the client is assumed to be down. However, this methodology suffers from the same deficiencies as the EMFs: that the utilities are unable to determine if the system is really down or if the network is down.

Another utility developed by Hewlett-Packard, known as Foundation Monitor, is delivered as a utility within Hewlett-Packard's Service Guard Enterprise Master Toolkit. Foundation Monitor runs as a program from each node in a cluster in a peer collection scheme. Each node is capable of reporting availability data on itself. However, Foundation Monitor does not monitor the availability of stand-alone systems. Furthermore, availability reporting is somewhat inaccurate because data resides on the monitored node until gathered once during every 24 hour period. Finally, data security issues are present, since data is only uploaded from the monitored node once every 24 hours.

Accordingly, there has been a need to centrally measure true system availability of multi-server or clustered server systems so that critical information identifying downtime events that compromise effectiveness can be discovered, fault tolerant system solutions can be designed to prevent common causes of downtime, and realistic availability goals can be created and monitored.

Along with accurately measuring true system availability, enterprises require effective troubleshooting of computer system failures. This troubleshooting involves determining whether the system failure was due to a software failure or a hardware failure by checking file log data, such as a tombstone log, for hardware failure information, system core files for software failure information, and analyzing that information. This procedure requires the involvement of specially trained support engineers known as Business Recovery Specialists.

Current processes for troubleshooting system failures and identifying root cause are manually focused. Current tools have trouble distinguishing between scheduled downtime and system or network failures, so detection of system failures is typically done by a system administrator. A significant percentage of system failures are never reported past the enterprise for further analysis. A support engineer then examines specific log files, such as tombstone files and core system files, to determine if the failure was due to a hardware or software problem. These files are often system specific. If the log files indicate a hardware problem, then a file log is retrieved and transferred for further analysis. Some semi-automated tools exist for this analysis, such as WTEC HPMC Decoder. If the log files indicate a software problem, the kernel core file is transferred for analysis via tools such as Q4.

Hewlett-Packard has developed several utilities for handling system failures. Network Node Manager can monitor systems over a network and detect down (or unresponsive) systems. It is typical of many remote-monitoring tools. Its limitations include difficulty in distinguishing between system failures, scheduled maintenance, and network connectivity problems. It has no mechanism to determine the root cause of system downtime.

Another utility developed by Hewlett-Packard is HA Meter. HA Meter measures the availability of computer systems. It can automatically determine if the root cause of system downtime is due to software installation, but other types of downtime require manual annotation. HA Meter generates availability reports listing downtime by root cause; however, this data must be manually entered. HA Meter is one application in a suit of utilities developed by HP called HA Observatory.

Another utility developed by Hewlett Packard is HP Event Notifier. HP Event Notifier is a SuperDome monitoring tool that uses the SuperDome GSP to detect system failures. While HP Event Notifier can automatically notify HP Response Centers of system failures, it does not determine root cause or collect system data for failure analysis.

Accordingly, there has been a need to automate the process for determination of the root cause of a system failure and automating the transferring of the necessary information for analysis of the failure.

SUMMARY OF THE INVENTION

According to one embodiment of the present invention, an automated method for root cause analysis of system failures may include generating an event when a computer system detects a system failure; determining the cause of the system failure; and transmitting the event, including the determined cause, from the computer system to a central repository. The computer system may re-transmit the event if a receipt confirmation message is not received from the central repository. The computer system may store the event in a local repository located on the computer system. The computer system may hold the event in a queue if a receipt confirmation message is not received from the central repository; and re-transmit the events in the queue after a period of time. The computer system may determine if the system failure was caused by hardware or software by analyzing the file log and the system core files, respectively. The computer system may assign each system failure event a unique sequence number, and upon receiving a status request from the central repository, synchronize the local repository and the central repository if the sequence number does not match the expected sequence number. This synchronizing may be done by transmitting missing events in the central repository from the computer system, transmitting missing events in the local repository form the central repository, and discarding events that have already been received. The information in the central repository may be retransmitted to a remote location for further collection and analysis.

The present invention is also embodied in an apparatus for analyzing the root cause of system failures on one or more computers. The apparatus includes a network, a local support computer coupled to the network, one or more stand-alone computer systems to be monitored coupled to the network, one or more stand-alone computer systems to be monitored each coupled to a Test Station coupled to the network, and one or more clusters of computers coupled to the network. The computer system or Test Station is programmed to monitor itself or the attached stand-alone computer for system failures, respectively, to determine the cause of the system failure, and to transmit system failure events to the local support computer. A remote computer system may be connected to one or more local support computers to receive and analyze system failure information.

The present invention is also embodied in a means for analyzing the root cause of system failures on one or more computers where a local support computer has a means for transmitting data to one or more computer systems (stand-alone computers, Test Stations attached to stand-alone computers, and clusters of computers). The invention further includes a means for detecting system failures and a means for automatically determining the cause of the system failure. The cause of the system failure is then transmitted to the local support node. The invention may also include a means for transmitting system failure information from one or more local support computers to remote support computers for further analysis and collection.

BRIEF DESCRIPTION OF THE DRAWINGS

The foregoing and other aspects, features, and advantages of the present invention will become apparent from the following detailed description, taken in conjunction with the accompanying drawings, illustrating by way of example the principles of the invention.

FIGS. 7A-G are flowcharts illustrating an operational procedure and various event processing procedures for the agent component of FIG. 3;

FIGS. 8A-B are flowcharts illustrating an operational procedure for the server component of FIG. 5;

FIGS. 8C-D are flowcharts illustrating reporting and exporting procedures for the server component of FIG. 5; and FIGS. 8E-F are printouts illustrating output of the reporting and exporting procedures of the server component of FIG. 5.

DETAILED DESCRIPTION

A Root Cause ("RC") analyzer or monitor, according to an embodiment of the present invention, automatically determines the root cause of a system failure and automatically transfers that information for further analysis. Unlike prior art root cause analyzers based on manual analysis, the present invention is automated. Additionally, the root cause analyzer is advantageously robust: monitorable entities may be discovered automatically; failure data may be maintained over multiple reboots; retry mechanisms are provided to transmit failure data in the presence of network or software failures; and data recovery mechanisms can preserve failure data across disk failures.

Figure 1:
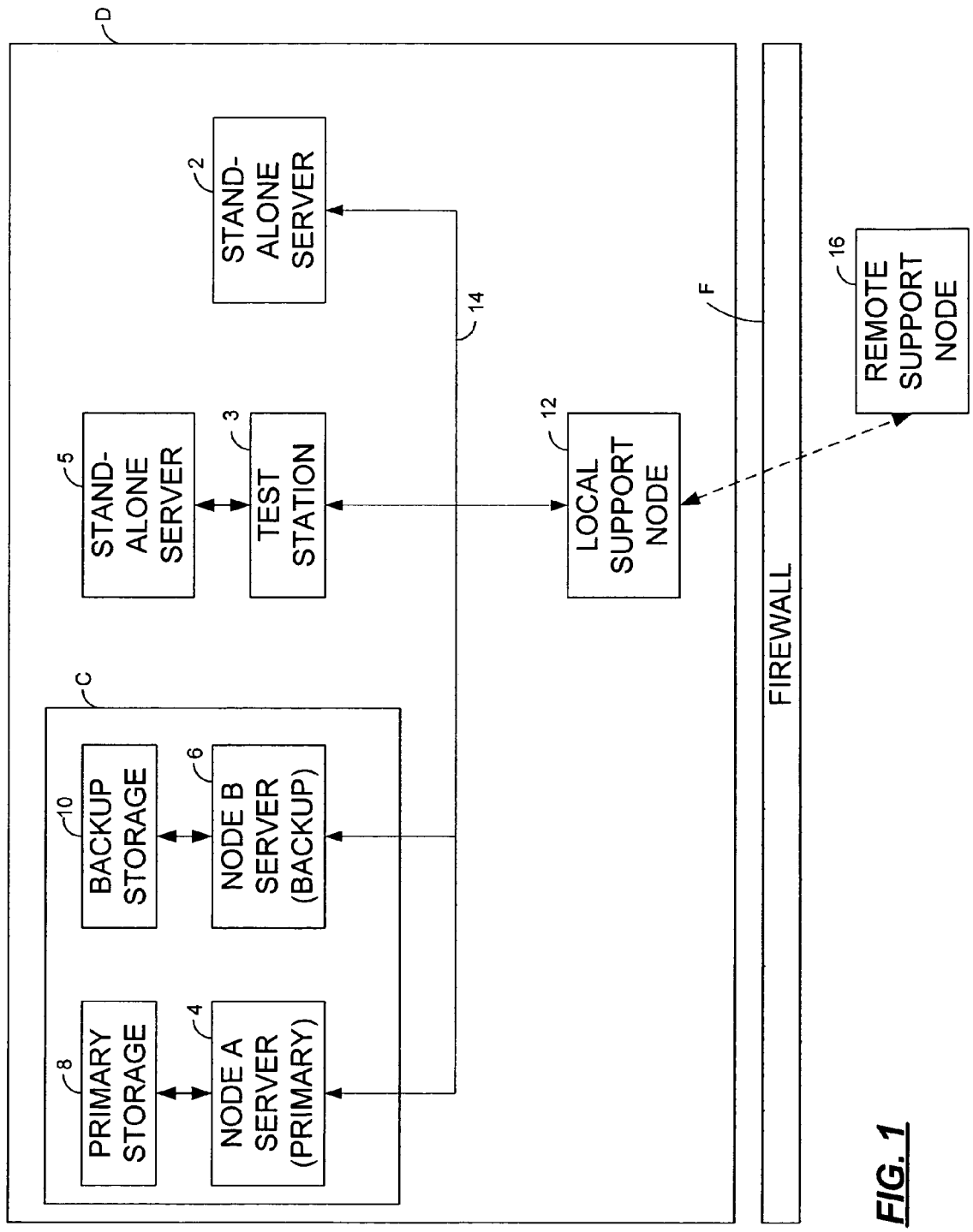
FIG. 1 is a block diagram illustrating a computing data center D, upon which an embodiment of the root cause analyzer of the present invention may be implemented.

Now referring to FIG. 1, there is illustrated a computing data center D, upon which an embodiment of the RC analyzer of the present invention may be implemented. The RC analyzer is related to a distributed software system capable of computing root causes of system failures on Stand-Alone Servers 2, Stand-Alone Servers 5 connected to a Test Station 3, and Nodes 4, 6 that are part of clusters C. Nodes, Stand-Alone Servers without a Test Station, and Test Stations are referred to as monitored entities.

In FIG. 1, an exemplary two node cluster C is shown comprised of a Node A Server 4 (i.e., primary server) and a Node By Server 6 (i.e., backup server), each coupled to a storage system (i.e., Primary Storage 8 and Backup Storage 10 respectively). A cluster is a networked grouping of one or more individual computer systems (a.k.a., nodes) that are integrated to share work, deliver high availability or scalability, and back each other up if one system fails. The nodes may have one or more central processing units or microprocessors, and are generally similar, if not identical, and each can be used by itself to perform a particular task. The cluster shown is only one of many different clustering methods. Other passive and active clustering methods, such as passive standby, duplicate everything, share nothing, and share everything are equally applicable to the present invention. Additionally, other storage system technologies, such as disk mirroring and RAID (redundant array of inexpensive disks) technology may be used. A package is a cluster-aware software element, such as a software application along with its programs, resources, and files, which may be restarted on another node in the event of a failure. Oracle's Parallel Server database is an example of a cluster-aware software application.

In an embodiment, the clusters are formed with Hewlett-Packard's ("HP") MC (multi-computer)/ServiceGuard solution implemented on HP 9000 enterprise servers each running a HP Unix (HP-UX) operating system. MC/ServiceGuard is a software facility for protecting mission-critical applications from a wide variety of hardware and software failures. The nodes of the cluster may be connected in a loosely coupled manner, each maintaining its own processor(s), memory, and operating system. Special communications protocols and system processes bind these nodes together and allow them to cooperate to provide a high availability of services. Alternatively, clusters could be formed with Windows NT, Novell or Unix servers using high-availability technologies, such as Microsoft's Cluster Service (a.k.a., Wolfpack), Novell's High Availability Solutions, Banyan Vines' products, NSI Software's products and Marathon Technologies Corporation's Assured Availability products. Although alternative clustering technologies may refer to systems, nodes and packages as "resources," the application of the present invention to those alternative technologies is not diminished.

The Stand-Alone Server 2, Stand-Alone Server 5, and Test Station 3 are RISC-based (reduced instruction set computer) HP 9000 enterprise servers running HP-UX. Alternatives include Intel-architecture machines made by various manufacturers; and other RISC-based computers made by manufacturers such as HP, IBM (International Business Machines), and Sun. Alternative operating systems include Windows NT, NetWare, SCO (Santa Cruz Operation), and Sun Solaris. The Test Station 3 is designed to monitor and control the Stand-Alone Server 5.

A Local Support Node 12 is coupled to the monitored entities such as Cluster C, Test Station 3 and Stand-Alone Server 2. The Local Support Node 12 serves as a central repository and a management console for the RC analyzer. The Local Support Node 12 is coupled to the Cluster C, Test Station 3, and Stand-Alone Server 2 by a Network 14, such as a TCP/IP (transmission control protocol/internet protocol) local area network ("LAN"). Other alternative network topologies, data transmission technologies, physical links, and geographically dispersed networks may also be used.

The RC analyzer may conveniently operate entirely behind a Firewall F, but yet allow remote access to failure data. A Remote Support Node 16 can establish a dial-up connection or other network connection with the Local Support Node 12 for the purpose of instructing the Local Support Node 12 to generate and download a report containing system failure information. Thus, failure data from multiple monitored entities can be collected from one or more Local Support Nodes 12, allowing the Remote Support Node 16 to also be used as a central repository. For example, an information technology service provider can install a RC analyzer at a number of customer data centers D. Periodically, the service provider (e.g., Remote Support Node 16) can connect with the customer's data center D to gather the failure data to identify cause events that created system failures.

Figure 2:
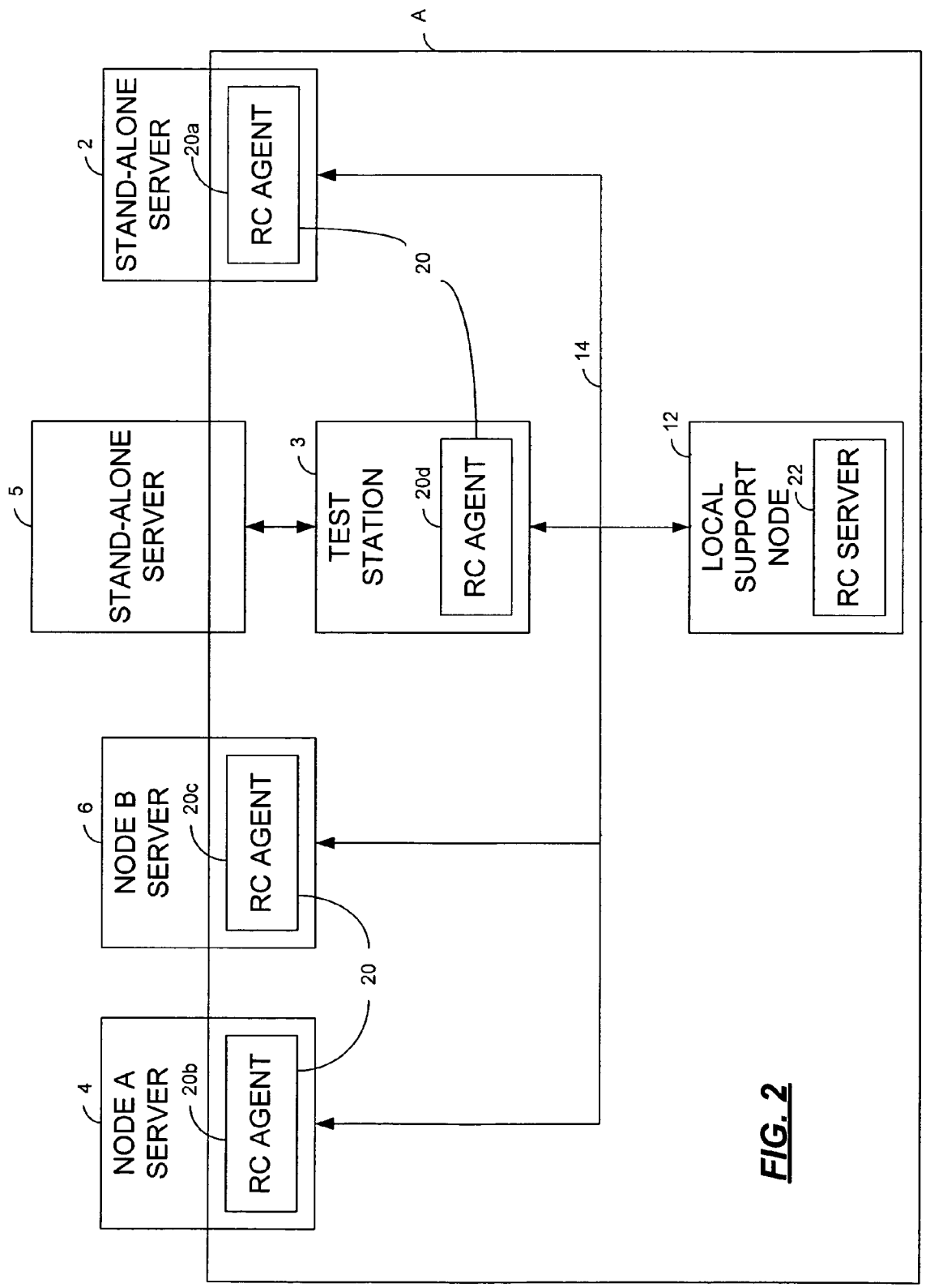
FIG. 2 is a block diagram illustrating a root cause analyzer architecture according to an embodiment of the invention.

Referring now to FIG. 2, there is illustrated a software architecture of a root cause ("RC") analyzer A according to an embodiment. The RC analyzer A includes one or more RC Agent 20 components 20a, 20b, 20c, 20d and a RC Server component 22. Each monitored entity has a RC Agent 20 installed. For example, the Stand-Alone Server 2 includes a RC agent 20a, the Node A Server 4 includes a RC agent 20b, and the Node B Server 6 includes a RC agent 20c. When a Test Station 3 is being used, the RC agent 20d is installed on the Test Station 3 instead of the Stand-Alone Server 5.

Each RC Agent 20 monitors the system failures of the system on which it is installed, except Test Station 3 monitors the system failures of Stand-Alone Server 5 and generates events when system failures of Stand-Alone Server 5 are detected.

The RC Server 22 is shown installed on the Local Support Node 12, which may be a non-monitored workstation or server. However, the RC Server 22 can also coexist with the RC Agent 20 within the same system or on the same workstation to form an alternative embodiment. For example, the Local Support Node 12 could be monitored by installing the RC Agent on the Local Support Node 12; or a production server such as Stand-Alone Server 2 could host the RC Server 22. In any case, the RC Server 22 receives events from the RC agents 20 and logs the events in a central data repository. The events are logged on the Local Support Node 12 and are available for report generation, data export and RC analyzer A management.

The RC analyzer A is designed to minimize utilization of network resources. Essentially, no network traffic (i.e., event) is generated between the RC Agents 20 and the RC Server 22 unless the monitor experiences downtime. The RC Server 22 rarely polls the RC Agent 20. During normal operations, each RC Agent 20 maintains failure data locally. Unless system downtime is detected, no events are generated.

Additionally, the RC analyzer A can distinguish between "unavailable" systems and "unreachable" systems. RC Agents 20 that cannot be reached over the Network 14 archive failure data until a connection can be reestablished with the RC Server 22. No failure data is reported for unreachable systems that are not "down."

The RC Agents 20 may receive a status query request from the RC Server 22. A status query event is similar to a ping command in that it merely provides an indication of whether a system is reachable. The RC Agent 20 may reply to the status query with either "OK," "EVENTS PENDING" or "ERROR." If no response is received by the RC Server 22, the server will ping the system to determine whether the Network 14 is down or whether the RC Agent 20 is down. The purpose of these requests is to verify that the monitored entity is not currently down and that the RC Server 22 has the most up-to-date failure data for the entity. If not, the RC Server 22 requests the RC Agent to resend the missing failure data. For example, when reports are generated on the RC Server 22, a request will be sent to the RC Agent 20 on each monitored entity to determine whether the entity is currently up.

Failure data is stored on both monitored entities (e.g., servers 2, 4, 6, and 3) and the Local Support Node 12. In the event of disk failures, most or all failure data will be recoverable. Each event generated on a monitored entity carries a unique sequence number. The RC Server 22 also maintains a history of sequence numbers for events originating on each monitored entity. A sequence mismatch indicates an inconsistency between the states of the RC Server 22 and the entity on which the event originated. In the event of a sequence mismatch, a recovery procedure is initiated to resynchronize the monitored entity and the RC Server 22.

Figure 3:
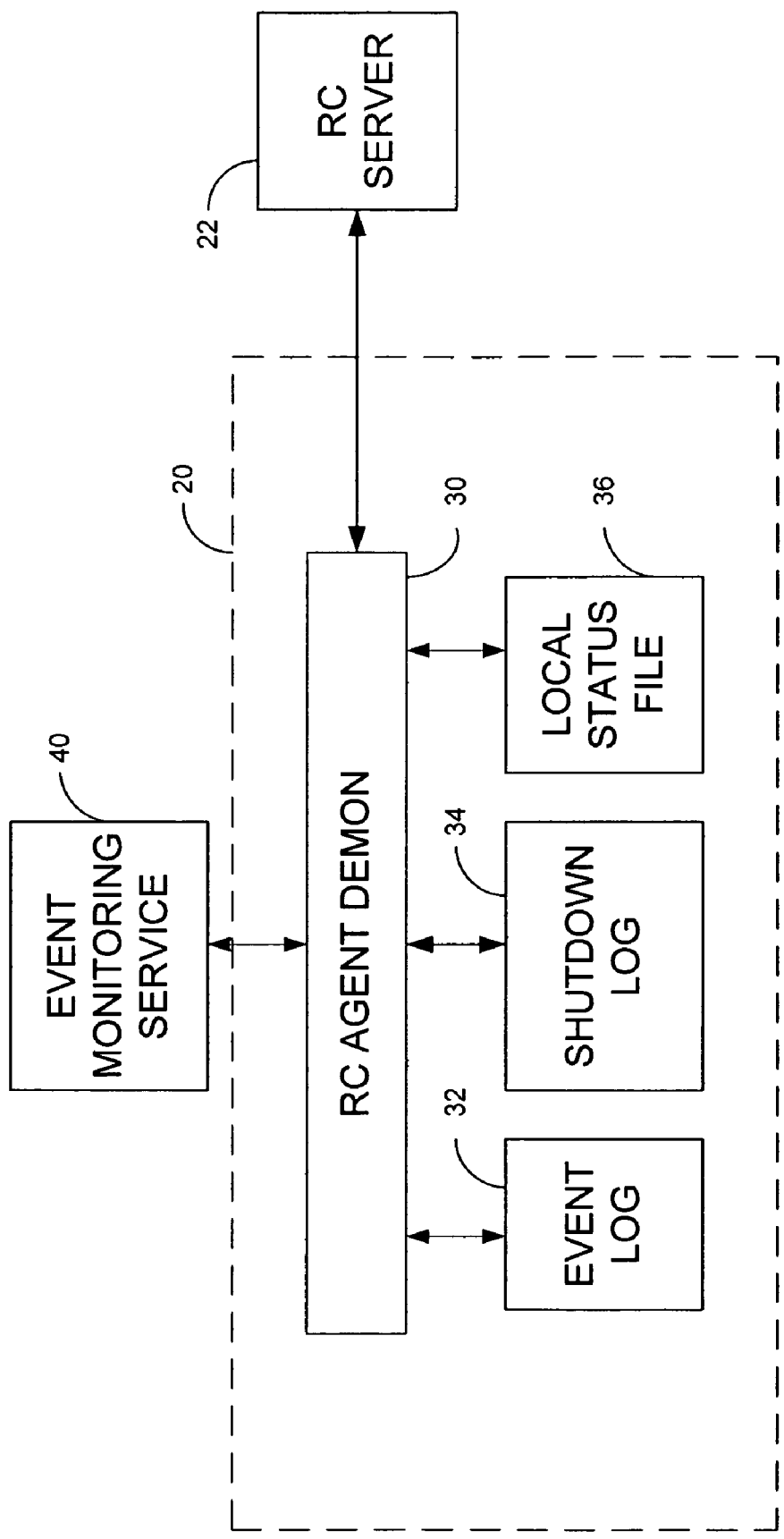
FIG. 3 is a block diagram illustrating an agent component of the root cause analyzer of FIG. 2.

Now referring to FIG. 3, there is illustrated an architecture of the RC Agent 20 according to the embodiment. The RC Agent 20 includes four logical components: a RC Agent Daemon 30, a Local Event Log 32, a Shutdown Log 34, and a Local Status File 36. The RC Agent 20 is connected to an Event Monitoring Service 40, detailed below, and to the RC Server 22.

The RC Agent Daemon 30 runs at the user root level as a daemon process under the operating system of the monitored entity. During normal operations, the RC Agent Daemon 30 writes a time stamp to the status file 36 at a programmable interval, such as 30 seconds. If the monitored entity is halted using the "shutdown" command, the RC Agent Daemon 30 will prompt the operator for a cause for the shutdown, write the reason to the Shutdown Log 34, send a "planned shutdown" event to the RC Server 22, a "cause" event to the RC Server 22, and update the Event Log 32. An exemplary list of shutdown reasons is listed in Table I below.

The RC Agent Daemon 30 is configured to restart automatically at boot time. Upon restart, the RC Agent Daemon 30 checks the Shutdown Log 34 to see if a system event was generated (graceful shutdown) when the monitored system went down. If so, the Shutdown Log 34 is deleted or cleared and a "restart" event is sent to the RC Server 22. If no "shutdown" event was sent (system failure), then the time stamp in the Local Status File 36 is used to compute the approximate time the system went down. Then an "unplanned shutdown," and a "restart" event are sent to the RC Server 22. The RC Agent Daemon 30 determines the cause for the shutdown by examining the file log and system core files, and a "cause" event is sent to the RC Server 22. The RC Agent Daemon 30 updates the Event Log 32.

TABLE 1

SHUTDOWN CAUSE SELECTION

| Cause # | Failure |
| --- | --- |
| 1 | Hardware Failure such as storage, memory, power supply, fan, I/O controller, or |
| 2 | Operating System Failure |
| 3 | Application Failure |
| 4 | Middlewear Failure |
| 5 | Patch/Software Failure |
| 6 | Kernel Reconfiguration |
| 7 | Hardware Upgrade/Install |
| 8 | Hardware Reconfiguration |
| 9 | Scheduled Reboot |
| 10 | Other Scheduled Maintenance |
| 11 | System Backup |
| 12 | Environmental Failure such as power failure, earthquake, or storm. |
| 13 | Other as Specified |

Whether the RC Agent 20 is monitoring a Stand-Alone Server 2, a Node 4, 6 of a cluster C, or a Stand-Alone Server 5 connected to a Test Station 3, events are captured and reported to the RC Server 22. An event may either indicate availability or unavailability of a particular resource (i.e. availability event) or the cause for unavailability of a monitored entity (i.e., cause event). Thus, availability and cause events are related to a particular system or node. For example, if a node fails, several events may be generated: a node event may be generated to indicate that the node is unavailable, and one or more cause events are generated to notify the reason for the unavailability. Table II indicates the types of data included in an availability event.

TABLE II

AVAILABILITY DATA

Event time stamp
Source
State
Event Type
Shutdown/Cause string
(for system events)
Sequence number The cause events are listed in Table I, and the availability events are listed in Table III.

TABLE III

1) Monitor start event - The RC Agent has started monitoring the system.
2) Monitor restart events - The monitored system rebooted.
3) Monitor shutdown events
   a) Planned - The system underwent an orderly shutdown.
   b) Unplanned - The system failed.

Figure 4:
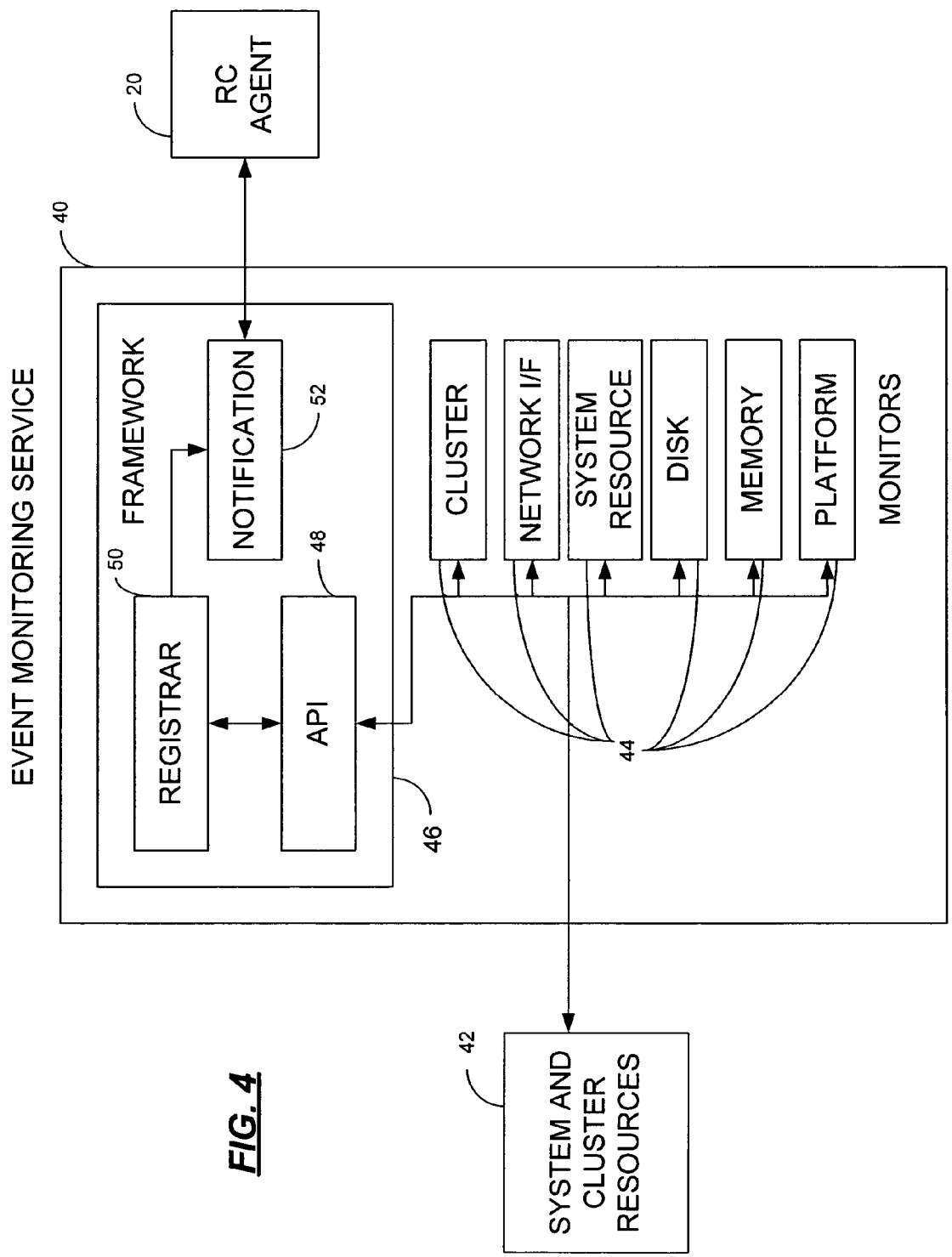
FIG. 4 is a block diagram illustrating an event monitoring service of the agent of FIG. 3.

Referring now to FIG. 4, there is illustrated a block diagram of the Event Monitoring Service 40 ("EMS"). The EMS 40 monitors system and cluster resources 42, such as disks, tapes, memory, nodes and packages. In the embodiment, the EMS 40 is a hardware vendor-supplied service to provide a high level of protection against undetected hardware failures that could interrupt system operation or cause data loss. The EMS 40 is a middleware application comprised of a set of Monitors 44 operating within a Framework 46, such as HP's Event Monitoring Service.

The Monitors 44 observe designated Resources 42 and report back resource values or events to the Framework 46. Resources supported by monitoring include mass storage devices such as disks and tapes, connectivity devices such as network adapters, system resources such as memory and processors, and cluster resources such as nodes and packages. Monitors 44 are applications written to gather and report information about specific resources on the system. The Monitor 44: provides a list of Resources 42 that can be monitored; provides information about the Resources 42; monitors the Resources 42 it supports; and provides values or events to the Framework 46. Any unusual or notable activity experienced by a hardware resource may be an event. For example, an event may report that a disk drive is not responding, or that a tape drive does not have a tape loaded. Monitors 44 may be either: event driven (asynchronous notification) or polled for status. Asynchronous notification is preferred, but not all monitors support asynchronous notification. Monitors 44 supporting only the polled method are acceptable provided the polling period can be sufficiently short to measure availability to a desired accuracy. In the embodiment, a polling period less than 30 seconds is sufficient. One example of a disk monitor is described on U.S. Pat. No. 5,983,316 entitled "Computing System having a System Node that Utilizes both a Logical Volume Manager and a Resource Monitor for Managing a Storage Pool," hereby incorporated by reference herein.

The Framework 46 provides the interface between the RC Agent 20 and the Monitors 44. The Framework 46 starts and stops the Monitors 42, stores information used by the Monitors 42, and directs Monitors 42 where to send events. During installation, the RC Agent 20 registers with the Event Monitoring Service 40 so that notifications are sent via transmission control protocol (TCP) to the interested RC Agent 20. The Framework 46 contains an Applications Programming Interface (API) 48, Registrar 50, and Notification Mechanism 52. The Registrar 50 includes a dictionary for a list of available Resources 42 and related Monitors 44. The Framework 46 evaluates the data and determines if any clients, such as the RC Agent 20, have registered interest in this event. Events generated by the Monitors 44 are captured by the Framework 46 and forwarded in an appropriate format by a Notification Mechanism 52 to the RC Agent 20.

Figure 5:
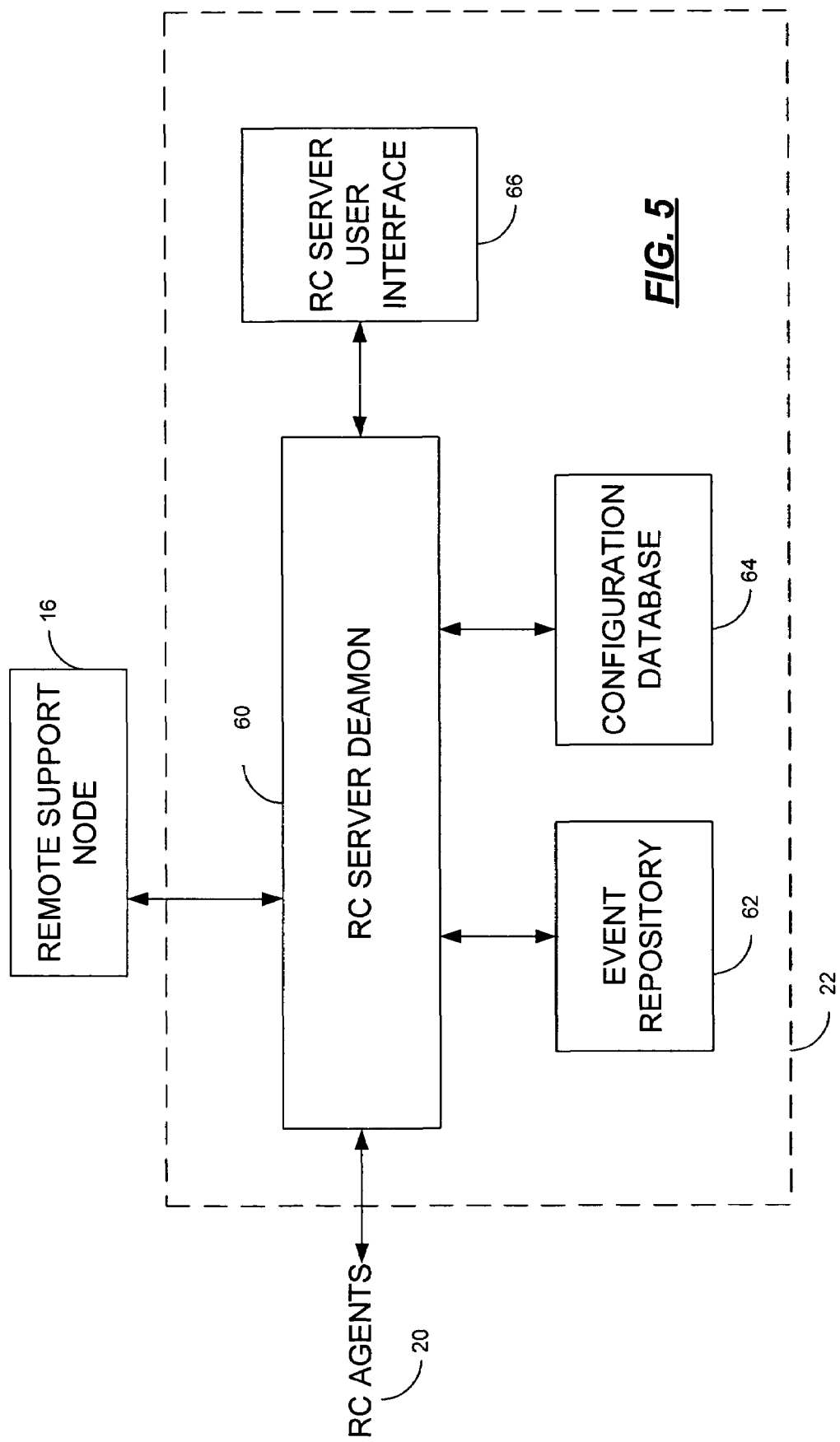
FIG. 5 is a block diagram illustrating a server component of the root cause analyzer of FIG. 2.

Now referring to FIG. 5, there is illustrated an architecture of the RC Server 22 according to the embodiment. The RC Server 22 is installed on the Local Support Node 12 and runs at the user root level as a daemon process under the operating system. The RC Server 22 includes four logical components: an RC Server Daemon 60, an Event Repository 62, a Configuration Database 64, and a User Interface 66. The RC Server 22 receives, acknowledges and processes events from RC Agents 20 of monitored systems, and requests from the User Interface 66. Output of the RC Server 22 includes requests to monitored systems and data exported or displayed through the User Interface 66 and the Remote Support Node 16. The RC Server 22 serves three primary functions: it serves as an on-site repository for all availability and failure data of a data center D; it serves as a management console for the distributed RC analyzer A; and it provides facilities for exporting or displaying RC analyzer data.

All availability and cause events received from RC Agents 20 are archived in the Event Repository 62. Availability events are used to construct a history of uptime and downtime for each monitored entity, as well as aggregate availability for sets of entities. Cause events are used to construct a history of the root causes of system failures for future analysis. Additionally, a history of availability and cause events is maintained as part of a data recovery mechanism.

It is possible that disk crashes or other catastrophic events could cause a loss of data at either the RC Agent 20 or RC Server 22 if the system state is restored from backup media. For this reason, each event received from the RC Agent 20 contains a sequence number. If the RC Server 22 is restored from backup, it is possible that previously received event messages are lost. If the RC Agent 20 is restored from backup, it is possible that the RC Server 22 may receive a duplicate event message. These situations are detected when sequence numbers are out-of-sequence. An agent-server recovery procedure (FIG. 8B) is provided to recover lost data from either the RC Agent 20 or RC Server 22.

The User Interface 66 consists of a series of HP-UX commands, such as in Table IV. The User Interface 66 will allow users to install or delete RC Agent 20 software on a monitored system, export availability and cause data, report availability over a specified period of time for individual entities or sets of entities, query the state of monitored entities, and report the cause of system failures over a specified period of time for individual entities or sets of entities.

TABLE IV

| COMMAND | FUNCTIONALITY |
| --- | --- |
| TBAHamadd | Install the RC agent on a system and begin monitoring the system. |
| TBAHamdelete | Delete the RC agent from a system. |
| TBAHamexport | Export availability data for use in other applications |
| TBAHamreport | Report availability and causes of system failures over a specified period of time for servers, nodes, packages, or clusters; report aggregate availability; report unplanned availability. |

The RC Server Daemon 60 contains most of the RC Server 22 logic and handles all incoming and outgoing events, whether they originate at a monitored client or in the User Interface 66. Like the RC Agents 20, the RC Server 22 is an event driven process. During normal operation it will sleep until an event is received. It will then process the event, possibly generate secondary events, and then go back to sleep. The RC Server Daemon 60 also manages all RC analyzer A data, and generates availability and root cause reports and summaries. A more detailed description of the function and operation of the RC Server Daemon 60 follows.

For each monitored entity, availability is computed by the RC Server 22 according to the following formula:

$$\text{Availability\_per\_period} = \left(\text{Total\_Period} - \sum_{\text{event}=1}^{K} \text{Downtime\_period}\right) / \text{Total\_period}$$

where Total_period is the period during which the entity has been monitored, and Downtime_period is the duration of an individual outage event, and there were K outages for the period. Availability_per_period ranges from 0 to 100%.

The RC analyzer A distinguishes two types of system downtime: planned and unplanned. A planned event includes the orderly shutdown of a host computer. Most other events are considered as unplanned. The availability metric computed by the RC analyzer A includes all downtime, regardless of cause or planned versus unplanned status. Alternatively, because more interest is focused on unplanned downtime in contrast to planned downtime, availability could also be computed without regard to planned downtime. Downtime may be defined differently for each monitored entity and is discussed further below.

System downtime may be defined as the time between system shutdown or crash and the restart of the RC Agent 20. "Planned" versus "unplanned" downtime is distinguished primarily on the basis of how the system is shutdown. If a customary shutdown command, such as a Unix "/shin/shutdown" or Windows NT "shutdown", is used to halt the system, the downtime is treated as "planned." Otherwise, the shutdown is treated as "unplanned." The time of the system shutdown or crash is computed from the corresponding time stamp in the shutdown log if the system was stopped gracefully, or from the last time stamp in the Local Status File 36 if the system crashed or was halted without the "shutdown" command (system failure). If a downed system is restarted in a diagnostic mode or single-user mode, the time spent in these modes is counted as "downtime" (i.e., not available for service).

During normal operation, the RC Server 22 will sleep until an event is received. The RC Server 22 will then process the event, possibly generate secondary events, and then go back to sleep. The RC Server 22 can receive four types of events. Availability events and cause events originate from RC Agents 20 running on monitored entities. Data request events and management events originate in the RC Server User Interface 66 or from the Remote Support Node 16.

Availability and cause events are sent from a monitored entity to indicate that the state of the monitored entity has changed. When an availability or cause event is received, the RC Server 22 first checks the event sequence number and initiates any necessary recovery protocols. The event is then archived and any secondary events are generated.

Data request events and management request events originate in the RC Server User Interface 66 and are communicated to the RC Server Daemon 60. Data is returned to the User Interface 66 and written to standard out. Data request events cause the RC Server 22 either to export RC analyzer data in a format such as CSV (comma delimited text) suitable for a report generation tool like a spreadsheet, such as shown in FIG. 8F.

Management request events cause the RC Server Daemon 60 to install or deinstall RC Agent software on a specified system. Deinstallation will not cause the RC Server Daemon 60 to delete all data associated with the specified system since the data may be needed for historical analysis.

Figure 6:
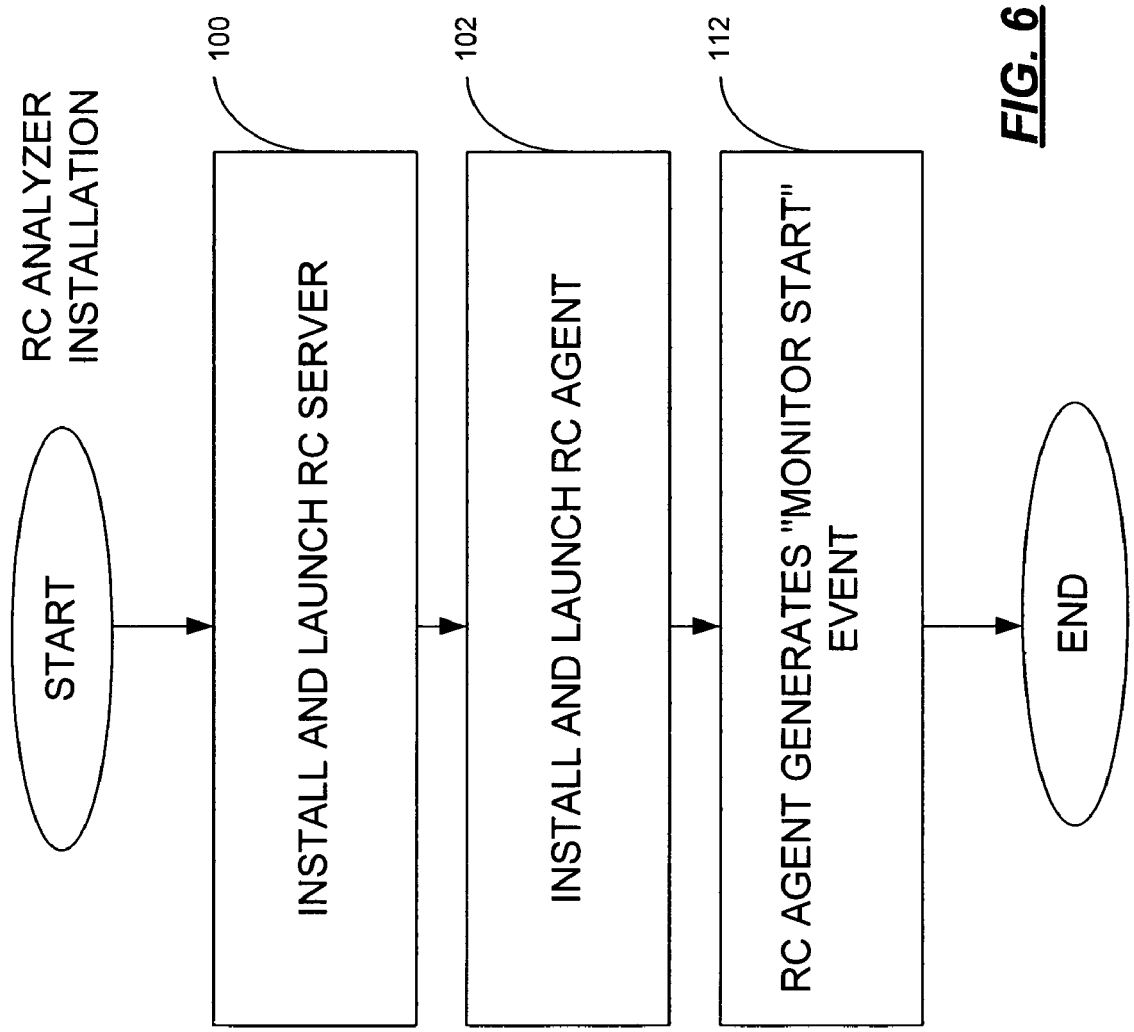
FIG. 6 is a flowchart illustrating an installation procedure for the root cause analyzer of FIG. 2.

Referring now to FIG. 6, there is an illustrated flowchart of a procedure for installing the RC analyzer A on a collection of systems, such as site D. According to the embodiment, the RC Server 22 should be installed before the RC Agent 20 so that the RC Agent 20 can conveniently register with the RC Server 22 upon installation. This preference is reflected in the flowchart where at step 100 the RC Server 22 is installed on the Local Support Node 12. Next at step 102, a sub-procedure installs each RC Agent 20 on the monitored entities, such as Nodes 4 and 6, Stand-Alone Server 2, and Test Station 3. At step 112, the RC analyzer installation procedure causes each installed RC Agent 20 to generate a "monitor start" event. Steps 102-112 can be repeated for each monitored entity.

After installation, the RC Agents 20 and RC Server 22 are operational without rebooting the system. The RC Agent 20 is automatically installed via management scripts provided by the RC Server 22, but alternatively the agent can be manually installed according to normal software installation procedures. The RC Agent 20 and RC Server 22 may co-exist on the same system. At step 102, the RC analyzer installation procedure installs and launches the RC Agent 20 software on the monitored entity. Startup and shutdown scripts are provided to ensure that the RC Agent 20 is started and stopped automatically.

Figure 7B:
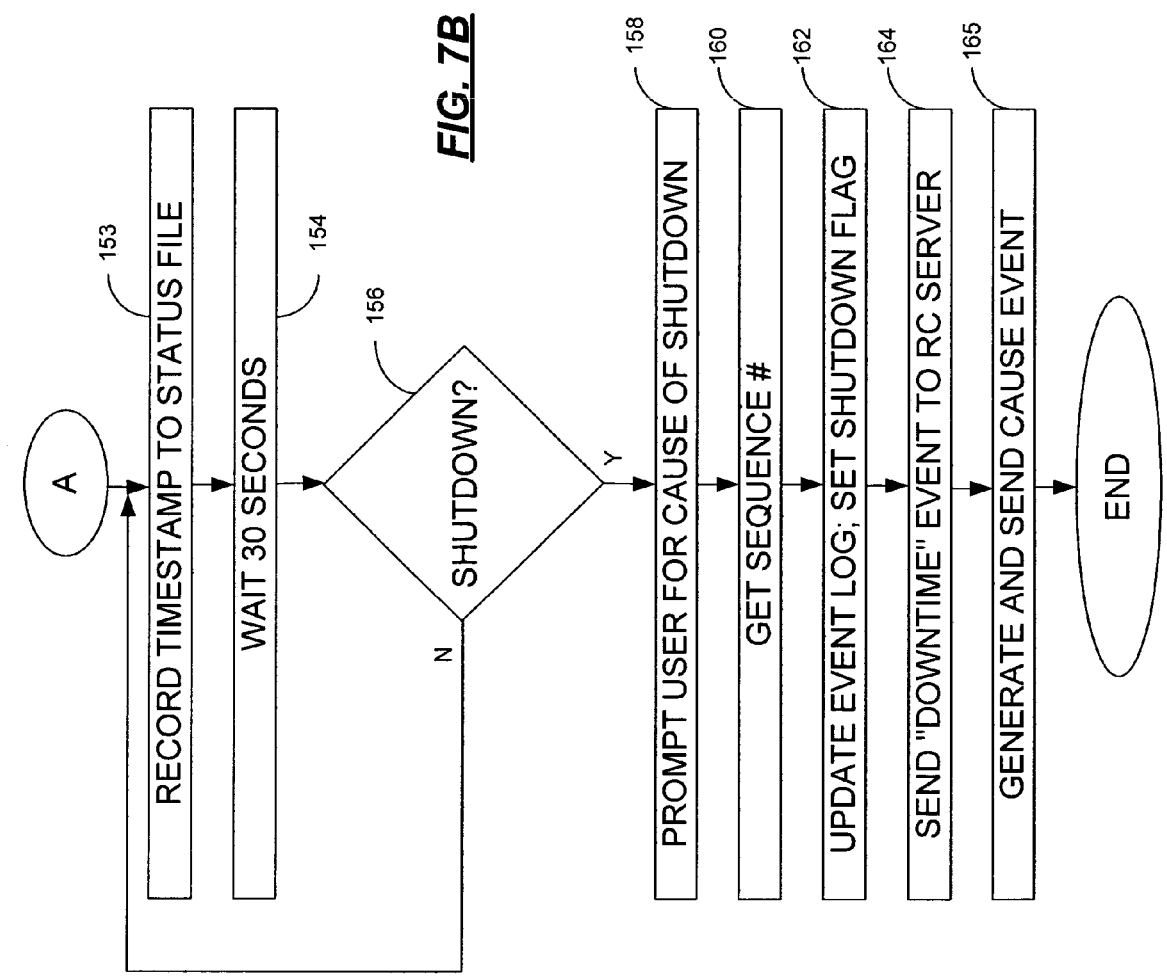

Now referring to FIGS. 7A-B, there is illustrated a flowchart of an operational procedure of the RC Agent 20. For simplicity, the procedure is illustrated as a single process although in the embodiment the procedure is implemented as several event driven processes.

The RC Agent 20 is restarted automatically at boot time. At step 130, the RC Agent 20 will check for the presence of the Shutdown Log 34 to see if a downtime event was generated when the system went down (i.e., graceful shutdown). The presence of the Shutdown Log 34 indicates that a graceful shutdown occurred. If a downtime event was generated, the procedure branches to steps 132-140 where the Shutdown Log 34 is deleted and the RC Server 22 is notified that the system is up. At step 132, the Shutdown Log 34 is deleted. Next at step 134, the Status File 36 is updated with the current time stamp. At step 136, the Event Log 32 is updated with a "system uptime" event. Events are archived in the Event Log 32 before transmission to RC Server 22. This allows events to be retransmitted in the presence of communication failures between the RC Agent 20 and RC Server 22 or data loss at either system. At step 138, a sequence number is generated by adding one to the previous event sequence number stored in the Event Log 32. At step 140, the "system uptime" event is sent to the RC Server 22. The "system uptime" event contains the time the system returns to operational status (i.e., current time stamp), the sequence number and system identification data, such as in Table II. From step 140, the procedure continues to step 151, discussed below.

If a downtime event was not generated when the monitored system went down (i.e., system failure), at step 130 the procedure branches to steps 142-150 and 300 where a shutdown time is approximated and the RC Server 22 is notified that the system cycled and the cause for the system failure. At step 142, the last time stamp is read from the Status File 36. At step 144, the Status File 36 is updated with a current time stamp. At step 146, the Event Log 32 is updated with a "downtime" event and an "uptime" event. The time stamp for the "downtime" event is approximated based on the last recorded time stamp in the Status File 36. Because a time stamp is written periodically, such as 30 seconds, it can be assumed that a crash must have occurred within 30 seconds of the last time stamp. Thus, the time stamp for the "downtime" event could be approximated to be the last recorded time stamp, or within 30 seconds of the last recorded time stamp. The time stamp for the "uptime" event is simply the current time stamp. At step 146, a sequence number is generated by adding one to the previous event sequence number stored in the Event Log 32. At step 150, the "downtime" and "uptime" events are sent to the RC Server 22. At step 300, a cause event is generated and sent to the RC Server 22, as more fully described in FIG. 7G. The procedure then continues from step 300 to step 151.

Figure 7G:
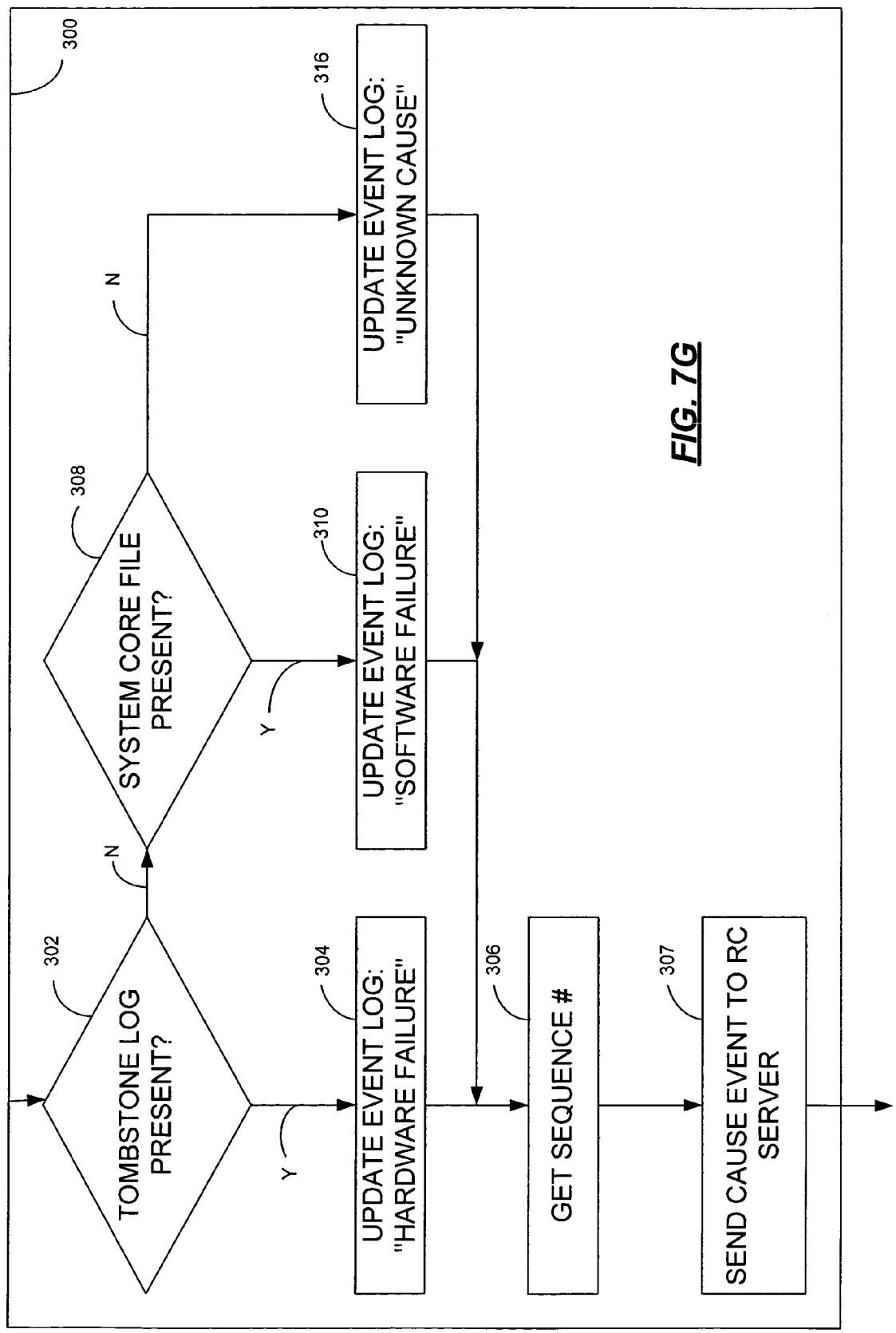

Now referring to FIG. 7G, the generate cause event procedure 300 automatically determines the root cause of the unplanned system failure. At step 302, the procedure determines if a Tombstone Log is present. The presence of a Tombstone Log indicates that the system failure was due to a hardware problem. If a Tombstone Log is present, the procedure branches to step 304, else it continues to step 308. At step 304, the procedure updates the Event Log 32 with a cause event, including the information stored in the Tombstone Log. At step 306 a sequence number is generated by adding one to the last number stored in the Event Log 32. At step 307, the procedure sends the cause event, including the associated data, to the RC Server 22. The procedure then continues to step 151.

If a Tombstone Log was not found at step 302, the procedure continues to step 308. At step 308, the procedure looks for the presence of System Core Files. The presence of System Core Files indicates that the system failure was due to a software problem. If System Core Files are present, the procedure branches to step 310, else it continues to step 316. At step 310 the procedure updates the Event Log 32 with a cause event, including the information stored in the System Core Files. The procedure then continues with step 306 as discussed above.

If System Core Files were not found at step 308, the procedure continues to step 316. At step 316, the procedure updates the Event Log 32 with a cause event, indicating an "unknown cause" for the system failure. The procedure then continues with step 306 as discussed above.

In this embodiment, where the RC Agent 20 is installed on a Test Station 3, the Tombstone Log checked in step 302 is located on the Test Station 3, allowing analysis of the system failure without having to wait for the Stand-Alone Server 5 to restart. The System Core Files checked in step 308 are located on the Stand-Alone Server 5, forcing the RC Agent 20, upon reaching step 308, to wait until the Stand-Alone Server 5 restarts.

The RC Agent 20 may be unable to initiate contact with the RC Server 22 due to network partition, unavailable RC Server system, or internal RC Server problems. At step 151, the RC Agent 20 checks for a confirmation message from the RC Server 22 indicating receipt of the transmitted events. If a confirmation message has not been received, the process branches to step 152 where the event is placed on a queue for re-sending after a configurable delay, such as one hour. If a confirmation message is received, the process continues from step 151 to step 153. If the RC Agent 20 crashes before the queue is flushed, the uncommunicated events will be detected with a sequence mismatch, and a recovery protocol will be initiated.

Now referring to FIG. 7B, at step 153, the RC Agent 20 begins a deadman timer loop to periodically update the status file 36 in the event of a system failure. A time stamp is recorded in the Status File 36 at step 153. The RC Agent 20 waits (step 154) for a predetermined period of time, such as 30 seconds, before recording another time stamp in the Status File 36. If while updating the Status File 36, the RC Agent at step 156 detects a shutdown operation, the procedure will branch to step 158. If no shutdown operation is detected, the procedure continues to loop from step 156 to step 153. Although illustrated here as part of a larger operational process, this deadman timer loop runs continually in the background. The predetermined period of time can be increased to lower system utilization, or decreased to improve the accuracy of estimating crash time.

At step 158, the procedure tracks a graceful shutdown by prompting the user for a cause of the shutdown. The user may respond with a cause such as those listed in Table I. At step 160, the procedure begins to prepare an event message by generating a sequence number for the event. Before the event is sent to the RC Server 22, the RC Agent 20 at step 162 records a time stamp in the Status File 36 and records the event in the Event Log 32. Because this is a graceful or planned shutdown, a Shutdown Log 34 is created. The Shutdown Log 34 is an empty file that simply acts as a shutdown flag. At step 164, the procedure generates and sends a "downtime" event to the RC Server 22 to indicate that the monitored system was shut down. The RC Server 22 will use the downtime event in calculating unplanned and planned downtime for the monitored system. At step 165, the procedure then generates a "cause" event based on the cause given by the user for the shutdown. The "cause" event is recorded on the Event Log 32 with a new sequence number. The "cause" event is then sent to the RC Server 22.

Now referring to FIGS. 7C-F, there are illustrated various event processing procedures performed by the RC Agent 20. FIG. 7C illustrates a flowchart of a procedure responsive to a status query request from the RC Server 22. The purpose of a status query request is for the RC Server 22 to verify that the monitored entity is not currently down and that the RC Server 22 has the most up-to-date availability and system failure data. This is desirable since a system "downtime" event or "cause" event may not be reported to the RC Server 22 until the system is restarted, which could lead to temporary inaccuracies in system data calculations. In this embodiment, the RC Agent 20 is installed on a Test Station 3, such that when the Stand-Alone Server 5 fails, the Test Station is able to report the system unavailability event and the cause event immediately. At step 170, a status query request is received by the RC Agent 20 from the RC Server 22. At step 172, the RC Agent 20 may reply to the status query with either "OK," "EVENTS PENDING" or "ERROR." A status of "OK" indicates that the RC Agent 20 is functioning correctly and that all availability events have been successfully transmitted to the RC Server 22. An "EVENTS PENDING" status indicates that the RC Agent 20 has not yet reported all events to the RC Server 22. In response to the status queue request, any queued events are immediately sent to the RC Server 22. An "ERROR" status indicates that the RC Agent 20 is unable to function as expected; the query response also indicates a troubleshooting message, such as "cluster event monitor not responding." Failure to respond to a status query request indicates that either the system is "unreachable" (i.e., network failure) or the RC Agent 20 is "down." The RC Server 22 may attempt to distinguish between these cases by pinging another monitored entity. A successful ping indicates that the problem is most likely with the RC Agent 20, and an appropriate error message will be included with the expected data. An "unreachable" system will be temporarily assigned a status of "UNREACHABLE" by the RC Server 22.

FIG. 7D illustrates a flowchart of a prodecure performed by the RC Agent 20 in response to a cluster event, signifying an event has occurred relating to a cluster of high-performance servers which was detected by a monitor 44 specific to monitoring such clusters.. At step 174, the RC Agent 20 receives a record of the event from the cluster monitor, and at step 176 a sequence number is developed by adding one to the previous sequence number. The status file and event log are updated at step 178, and the record of this event is sent to the RC server 22 at step 180.

FIGS. 7E-F illustrate flowcharts of procedures performed by the RC Agent 20 in response to the RC Server 22 identifying a loss of data. It is possible that disk crashes or other catastrophic events could cause a loss of RC Analyzer data if the system state is restored from backup media. The agent-server recovery protocols illustrated in FIGS. 7E-F are designed to recover lost data when possible.

Receipt by the RC Server 22 of a duplicate event sequence number indicates either the delivery of a duplicate event (possibly due to temporary loss of connectivity) or a loss of data on the monitored entity. The RC Server 22 checks the message content to determine if it is in fact a duplicate. Duplicate events are simply discarded; however, a new event with a reused sequence number indicates a loss of data on the monitored entity. In this case, the RC Server 22 generates a restore data event and transmits the missing event records back to the monitored entity, as in step 182. The RC Agent 20 archives the restored data, updates its sequence number to the proper value, and resumes operation, as in steps 184 and 186.

If the RC Server 22 is restored from backup, it is possible that previously received event messages will be lost. This situation is detected when the RC Server 22 receives an out-of-sequence message, indicating that some previous messages have been lost. The RC Server 22 generates a data request event and transmits it to the monitored entity, as in step 188. The data request event contains the sequence numbers of the missing events and results in their retransmission if they are still available on the monitored entity, as in step 190. If the requested events are no longer available, a new monitoring baseline is constructed using information from the monitored entity when possible.

Figure 8A:
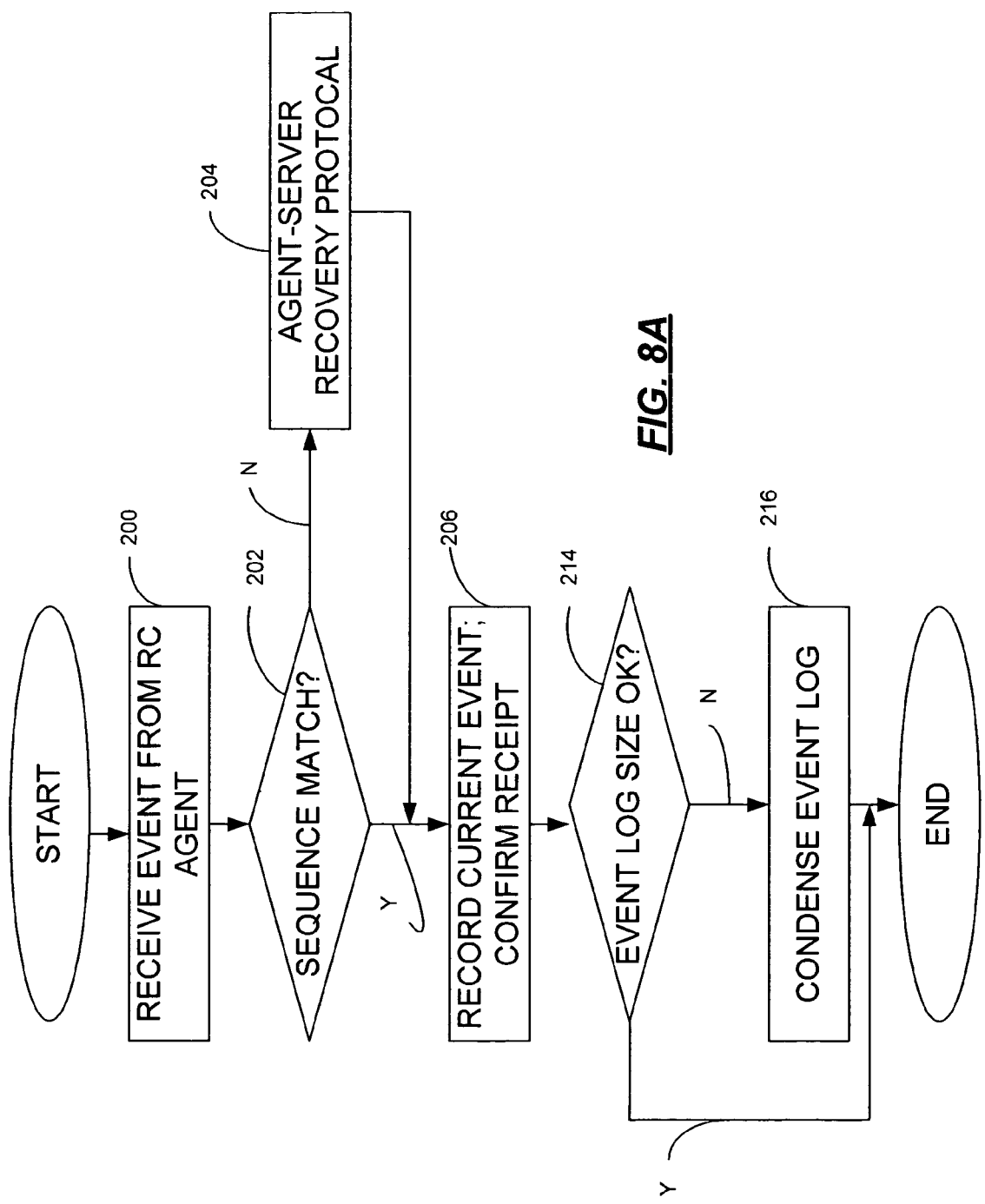

Now referring to FIGS. 8A-B there is illustrated a flowchart of an operational procedure of the RC Server 22. The RC Server 22 is an event driven process. Generally during normal operation, the RC Server 22 will sleep until an event is received, process the event, possibly generate secondary events, and then go back to sleep.

Availability and cause events are received from monitored entities (i.e., systems 2, 4, 6, and 3) to indicate that the state of a monitored entity has changed, as shown in step 200, or in the event of Test Station 3, that the state of the Stand-Alone Server 5 has changed. When an event is received, the RC Server 22 checks the event sequence of the received event message.

The RC Server 22 maintains a record of event sequence numbers for each monitored entity. Sequence numbers are used to assure the proper ordering of events from a given system, the reliability of the communications medium, and the integrity of the data as a whole. If at step 202 the event sequences do not match, the procedure branches to step 204 to initiate an agent-server recovery procedure (discussed below). If at step 202 the event sequences match, the procedure continues to step 206 where the RC Server 22 records the current event in the Event Repository 62 and acknowledges receipt of the event to the monitored entity.

Next at step 214, the procedure checks the size of the Event Repository 62. If the size of the Event Repository 62 is larger than a programmable value, such as 5 MB, the procedure branches to step 216. Otherwise, the procedure waits for another event message to be received. At step 216, the Event Repository 62 is condensed by deleting availability and cause data after it reaches a programmable age, such as 2 years. Alternatively, the data could be summarized.

Referring now to FIG. 8B, there is illustrated the agent-server recovery procedure 204. At a step 220, the procedure first determines whether the sequence number received from the monitored entity is greater than the sequence number maintained by the RC Server 22. If so, the procedure branches to step 222 where a data request event is transmitted to the monitored entity. The RC Server 22 waits at step 224 for the monitored entity to return the missing events in response to the data request event. Receipt of the missing events is confirmed by the RC Server 22 to the monitored entity. The missing events received from the monitored entity are treated as new events and processed according to step 206.

If the sequence number received from the monitored entity is not greater than the sequence number maintained by the RC Server 22, then at step 220 the procedure branches to step 226 to determine if the event is a duplicate of an event already received. Receipt by the RC Server 22 of a duplicate event sequence number indicates either the delivery of a duplicate event (possibly due to temporary loss of connectivity) or a loss of data on the monitored entity. The procedure 204 checks the message content to determine if it is in fact a duplicate. Duplicate events are simply discarded at step 228.

However, a new event with a reused sequence number indicates a loss of data on the monitored entity. In this case, the procedure branches to step 230 where the RC Server 22 generates a restore data event and transmits the missing event records back to the monitored entity, as shown in step 232. In response, the RC Agent 20 will archive the missing event records. The RC Server procedure goes back to sleep after processing the events.

Now referring to FIG. 8C, there is illustrated a flowchart of a reporting procedure of the RC Server 22. At step 240, the RC Server 22 receives commands via the User Interface 66 in the following format:

TBAhamreport [-b begin_date] [-e end_date] [[-x] entity1 [,entity2 [ . . . ]]]

where "begin-date" is the date and time at which availability calculations should begin, "end-date" is the date and time at which availability calculations should end, "entity<n>" specifies the entity for which data is desired, and the "-x" option specifies those entities to exclude from reporting. At step 242, in response to the command, the monitored entities are queried by the RC Server 22 to determine whether each monitored entity is currently reachable. This is desirable to avoid reporting inaccurate data, since a down system may not yet have reported a "downtime" event. If a system is found to be "unreachable," any data corresponding to it is flagged as potentially inaccurate. At step 244, availability is calculated according to the availability data stored in the Event Repository 62. Analysis of the system failure (cause data) stored in the Event Repository 62 is done at step 245. Finally, the report is formatted and provided in step 246.

FIG. 8E illustrates an exemplary report. The report contains the following sections:

1. report header stating data center D name, query period, and print date;
2. for each monitored entity class (i.e., system, cluster, node, package):
    availability history during query period for that monitored entity class;

aggregate availability statistics for all entities in each entity class;

detailed availability statistics and configuration information for each entity; and analysis of the root causes of system failures for that monitored entity 3. any RC analyzer A errors detected during the query period.

An Event History 260 shows individual downtime episodes, their duration, if any, whether they were anticipated or not (planned/unplanned), and the root cause if there was a system failure. If RC analyzer A started or stopped monitoring the entity during this period, that is shown. If downtime events were ongoing at the end of the query period, these are flagged with a '+'. Events are reported in the time zone in which they occurred, though their inclusion in the query period is determined with respect to the query period. If the downtime episode was anticipated, the planned field (denoted by P?) shows a 'Y', otherwise a 'N' is displayed. And if a downtime episode was not anticipated, its cause is indicated—in this case, a possible problem with hardware and software, possibly the ROM is defective.

An Aggregate Report 262 is devoted to summary statistics for a specified query period. These statistics reflect the monitored time of the query period, so any monitored entities that began or stopped monitoring during the query period are accounted for. If downtime episodes proceed past the end of the specified reporting interval, both the downtime and the monitored time are truncated to the query interval. The number of planned/unplanned events are reported as well as the aggregate downtime for each type of monitored entity. The final availability statistic is presented as the "availability for the period." Availability statistics only make sense with respect to the respective entity class. Thus, a single scalar value for availability for all the entities is not presented.

A Detailed Report 264 breaks out availability statistics by monitored entity (called out using the canonical naming scheme described above), and then summarized for all entity classes. Entity specific data are also reported, system failure information, and reporting accuracy. If the entity was unreachable at the report generation, this situation will be signified with the '?' annotation. In this case, the downtime episode may be later rectified when the system returns on-line, either as no downtime at all (network connectivity was responsible), or with more accurate figures. This may occur the next time TBAhamreport is run.

Now referring to FIG. 8D, there is illustrated a flowchart of a data export procedure of the RC Server 22. At step 250, the RC Server 22 receives commands via the User Interface 66 in the following format:

```
TBAhamexport [-b begin_date] [-e end_date] [[-x]
    entity1 [,entity2 [ . . . ]]]
``` where "begin_date" is the beginning date and time for exported events, "end_date" is the end date and time for exported events, and "entity<n>" specifies the entity for which data is desired. At step 252, availability is calculated according to the availability data stored in the Event Repository 62. At step 253, system failure data is analyzed according to the cause events stored in the Event Repository 62. At step 254, the data is formatted into a format suitable for import into a spreadsheet and output to a file. All availability periods (uptime, downtime and unmonitored time) are displayed for the query period. FIG. 8F illustrates exemplary output from the data export procedure.

Therefore, it can be seen from the foregoing that the invention provides a novel method and apparatus for measuring availability of computer systems and clusters of computers. Although several embodiments and variations of the invention have been described and illustrated, the invention is not to be limited to the specific forms or arrangements of the parts so described and illustrated. Thus, having illustrated and described the principles of the invention in an embodiment, it should be apparent to those of ordinary skill in the art that the invention can be modified in arrangement and detail without departing from such principles.

What is claimed is:

1. A method for analyzing the root cause of system failures on one or more computers, comprising:

generating an event when a computer system detects a system failure;

determining the cause of the system failure;

transmitting the event, including the determined cause, from the computer system to a central repository;

analyzing the system failure event in the central repository;

storing the event in a local repository located on the computer system; and synchronizing the local repository and the central repository, wherein the synchronizing step comprises:

transmitting missing events in the central repository from the computer systems, wherein the missing events correspond to system failure events for which causes were still being determined by the computer system at a time when the central repository made a request for event information to be sent thereto, and for which the causes have subsequently been determined by the computer system.

2. The method of claim 1, further comprising:

re-transmitting the event if a receipt confirmation message is not received from the central repository.

3. The method of claim 1, further comprising:

holding the event in a queue if a receipt confirmation message is not received from the central repository; and re-transmitting the event in the queue after a period of time.

4. The method of claim 1, further comprising:

determining if the system failure was due to a hardware problem by analyzing a file log.

5. The method of claim 1, further comprising:

determining if the system failure was due to a software problem by analyzing system core files.

6. The method of claim 1, further comprising:

assigning a sequence number to each event generated;

receiving a status request from the central repository; and synchronizing the local repository and the central repository if the sequence number does not match the expected sequence number.

7. The method of claim 1, wherein the synchronizing step further comprises:

transmitting missing events in the local repository from the central repository.

8. The method of claim 1, wherein the synchronizing step further comprises:

discarding events that have already been received.

9. The method of claim 1, further comprising:

retransmitting the information stored in the central repository to another computer system for further analysis.

10. The method of claim 1, wherein the central repository is in a SLEEP mode at all times other than when events are transmitted to the central repository from the computer system and analyzed by the central repository.

11. An apparatus for analyzing the root cause of system failures on one or more computers, comprising:
a network;
a local support computer coupled to said network;
a computer system coupled to the network, the computer system programmed to monitor itself and another computer system for system failures, to determine the cause of the system failure, and to transmit system failure events to the local support computer;
storing the event in a local repository located on the computer system; and
synchronizing the local repository and a repository of the local support computer,
wherein the synchronizing step comprises:
transmitting missing events in the repository of the local support computer from the computer systems,
wherein the missing events correspond to system failure events for which causes were still being determined by the computer system at a time when the repository of the local support computer made a request for event information to be sent thereto, and for which the causes have subsequently been determined by the computer system.

12. The apparatus of claim 11, further comprising:
the local support computer programmed to collect and analyze the system failure information.

13. The apparatus of claim 11, further comprising:
the computer system programmed to re-transmit the event if a receipt confirmation message is not received from the local support computer.

14. The apparatus of claim 13, further comprising:
the computer system programmed to assign a sequence number to each event generated;
the local support computer programmed to send a status request to the computer system, and to synchronize the local repository with the local support computer if the sequence number does not match the expected sequence number.

15. The apparatus of claim 11, further comprising:
the computer system programmed to hold the event in a queue if a receipt confirmation message is not received from the central repository, and to re-transmit the event in the queue after a period of time.

16. The apparatus of claim 11, further comprising:
the computer system programmed to determine if the system failure was due to a hardware problem by analyzing a file log.

17. The apparatus of claim 11, further comprising:
the computer system programmed to determine if the system failure was due to a software problem by analyzing system core files.

18. The apparatus of claim 11, further comprising:
a remote support computer connectable to the local support computer for receiving system failure data from the local support computer.

19. The apparatus of claim 11, wherein the central repository is in a SLEEP mode at all times other than when events are transmitted to the central repository from the computer system and analyzed by the central repository.

20. A means for analyzing the root cause of system failures on one or more computers, comprising:
a means for transmitting data from one computer to another,
a local support computer coupled to the means for transmitting data,
a computer system coupled to the means for transmitting data,
a means for the computer system to monitor itself or another computer system for system failures and determining the causes of the failures,
a means for transmitting the causes of the failures to the local support computer;
a local repository located on the computer system for storing the event; and
a means for synchronizing the local repository and a repository of the local support computer,
wherein the synchronizing means comprises:
a means for transmitting missing events in the repository of the local support computer from the computer system,
wherein the missing events correspond to system failure events for which causes were still being determined by the computer system at a time when the repository of the local support computer made a request for event information to be sent thereto, and for which the causes have subsequently been determined by the computer system.

21. The means of claim 20, wherein the central repository is in a SLEEP mode at all times other than when events are transmitted to the central repository from the computer system and analyzed by the central repository.

* * * * *

UNITED STATES PATENT AND TRADEMARK OFFICE
CERTIFICATE OF CORRECTION

| | | |
|---|---|---|
| PATENT NO. | : 7,516,362 B2 | Page 1 of 1 |
| APPLICATION NO. | : 10/804275 | |
| DATED | : April 7, 2009 | |
| INVENTOR(S) | : Jon Christopher Connelly et al. | |

It is certified that error appears in the above-identified patent and that said Letters Patent is hereby corrected as shown below:

In column 5, line 52, delete "By" and insert -- B --, therefor.

In column 18, line 27, in Claim 1, delete "systems," and insert -- system, --, therefor.

In column 19, line 16, in Claim 11, delete "systems," and insert -- system, --, therefor.

Signed and Sealed this

First Day of September, 2009

David J. Kappos
*Director of the United States Patent and Trademark Office*